(12) United States Patent
Whited

(10) Patent No.: US 8,448,340 B2
(45) Date of Patent: May 28, 2013

(54) LARGE DIAMETER NOTCHED BLADE AND BLADE HOUSING FOR POWER OPERATED ROTARY KNIFE

(75) Inventor: Jeffrey A. Whited, Amherst, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 662 days.

(21) Appl. No.: 12/697,714

(22) Filed: Feb. 1, 2010

(65) Prior Publication Data
US 2011/0185580 A1 Aug. 4, 2011

(51) Int. Cl.
*A22C 17/00* (2006.01)

(52) U.S. Cl.
USPC ............................................. 30/276; 452/133

(58) Field of Classification Search
USPC ................... 30/276, 340, 347, 329; 452/137, 452/132, 133
See application file for complete search history.

(56) References Cited

U.S. PATENT DOCUMENTS

| | | | |
|---|---|---|---|
| 1,220,345 A | | 3/1917 | Koster |
| 1,374,988 A | | 4/1921 | Cooper |
| 1,476,345 A | | 9/1922 | McGee |
| 2,123,712 A | | 7/1938 | Clark |
| 2,266,888 A | | 12/1941 | McCurdy et al. |
| 2,827,657 A | * | 3/1958 | Bettcher ........................ 452/137 |
| RE25,947 E | | 12/1965 | Bettcher |
| 3,269,010 A | * | 8/1966 | Bettcher ........................ 30/276 |
| 4,082,232 A | | 4/1978 | Brewer |
| 4,170,063 A | * | 10/1979 | Bettcher ........................ 30/276 |
| 4,178,683 A | * | 12/1979 | Bettcher ........................ 30/276 |
| 4,198,750 A | * | 4/1980 | Bettcher ........................ 30/276 |
| 4,236,531 A | | 12/1980 | McCullough |
| 4,267,759 A | | 5/1981 | Sullivan et al. |
| 4,326,361 A | | 4/1982 | McGill |
| 4,363,170 A | | 12/1982 | McCullough |

(Continued)

FOREIGN PATENT DOCUMENTS

| | | |
|---|---|---|
| EP | 0974431 | 1/2000 |
| EP | 1226907 | 7/2002 |
| EP | 2098341 | 9/2009 |
| FR | 1216947 | 4/1960 |

OTHER PUBLICATIONS

Oct. 3, 2011 Decision and Opinion of the United States Court of Appeals for the Federal Circuit (Appeal No. 2011-1038,—1046) regarding the case styled *Bettcher Industries, Inc.* v. *Bunzl USA, Inc. and Bunzl Processor Distribution, LLC* Case No. 3:08 CV 2423, U.S. District Court for the Northern District of Ohio, Judge Zouhary. The Decision and Opinion relates to U.S. Pat. No. 7,000,325 (47 pages).

(Continued)

*Primary Examiner* — Katherine Mitchell
*Assistant Examiner* — Jaime F Cardenas-Garcia
(74) *Attorney, Agent, or Firm* — Tarolli, Sundheim, Covell & Tummino LLP

(57) ABSTRACT

A power operated rotary knife having a large diameter, annular rotary knife blade and interfitting blade housing wherein the rotary knife blade includes notched bearing race providing for an enhanced or enlarged area of bearing contact between the blade bearing race and the corresponding blade housing bearing structure. The enhanced area of bearing contact is offset radially inwardly of and axially from a radial outer surface of a drive gear region of the blade thereby reducing wear on the radial outer surface of the blade drive gear region.

27 Claims, 11 Drawing Sheets

U.S. PATENT DOCUMENTS

| | | | | |
|---|---|---|---|---|
| 4,439,924 A * | 4/1984 | Bettcher | | 30/276 |
| 4,448,101 A | 5/1984 | Templeton | | |
| 4,492,027 A * | 1/1985 | Bettcher | | 30/276 |
| 4,494,311 A * | 1/1985 | McCullough | | 30/276 |
| 4,509,261 A * | 4/1985 | Bettcher | | 30/276 |
| 4,516,323 A * | 5/1985 | Bettcher et al. | | 30/276 |
| 4,575,938 A * | 3/1986 | McCullough | | 30/276 |
| 4,590,676 A * | 5/1986 | Bettcher | | 30/276 |
| 4,609,227 A | 9/1986 | Wild et al. | | |
| 4,637,140 A * | 1/1987 | Bettcher | | 30/276 |
| 4,829,860 A | 5/1989 | VanderPol | | |
| 4,854,046 A * | 8/1989 | Decker et al. | | 452/149 |
| 4,909,640 A | 3/1990 | Nakanishi | | |
| 5,099,721 A * | 3/1992 | Decker et al. | | 76/86 |
| 5,230,154 A | 7/1993 | Decker et al. | | |
| 5,331,877 A | 7/1994 | Ishii | | |
| 5,419,619 A | 5/1995 | Lew | | |
| 5,522,142 A | 6/1996 | Whited | | |
| 5,529,532 A | 6/1996 | Desrosiers | | |
| 5,664,332 A * | 9/1997 | Whited et al. | | 30/276 |
| 5,692,307 A * | 12/1997 | Whited et al. | | 30/276 |
| 5,761,817 A * | 6/1998 | Whited et al. | | 30/276 |
| 5,940,972 A * | 8/1999 | Baris et al. | | 30/276 |
| 5,971,413 A | 10/1999 | El-Kassouf | | |
| 6,070,945 A | 6/2000 | Ritchey et al. | | |
| 6,354,949 B1 | 3/2002 | Baris et al. | | |
| 6,604,288 B2 * | 8/2003 | Whited et al. | | 30/276 |
| 6,662,452 B2 * | 12/2003 | Whited | | 30/276 |
| 6,694,649 B2 * | 2/2004 | Whited et al. | | 30/276 |
| 6,751,872 B1 * | 6/2004 | Whited et al. | | 30/276 |
| 6,769,184 B1 * | 8/2004 | Whited | | 30/276 |
| 6,857,191 B2 * | 2/2005 | Whited | | 30/124 |
| 6,978,548 B2 * | 12/2005 | Whited et al. | | 30/276 |
| 7,000,325 B2 * | 2/2006 | Whited | | 30/276 |
| 7,107,887 B2 * | 9/2006 | Whited | | 83/13 |
| 7,340,840 B2 * | 3/2008 | Whited | | 30/276 |
| 7,670,212 B1 * | 3/2010 | Thompson et al. | | 452/133 |
| 8,037,611 B2 * | 10/2011 | Levsen | | 30/276 |
| 8,074,363 B2 * | 12/2011 | Whited | | 30/276 |
| 8,281,493 B2 * | 10/2012 | Levsen | | 30/276 |
| 2002/0096027 A1 * | 7/2002 | Whited et al. | | 83/13 |
| 2003/0084576 A1 * | 5/2003 | Whited et al. | | 30/276 |
| 2003/0131482 A1 * | 7/2003 | Long et al. | | 30/276 |
| 2003/0196333 A1 * | 10/2003 | Whited | | 30/276 |
| 2004/0088864 A1 * | 5/2004 | Whited | | 30/123 |
| 2004/0187316 A1 * | 9/2004 | Whited et al. | | 30/276 |
| 2004/0211067 A1 * | 10/2004 | Whited et al. | | 30/123 |
| 2005/0126015 A1 * | 6/2005 | Whited | | 30/276 |
| 2005/0178009 A1 * | 8/2005 | Whited | | 30/276 |
| 2005/0217119 A1 * | 10/2005 | Rapp | | 30/276 |
| 2006/0137193 A1 * | 6/2006 | Whited | | 30/276 |
| 2007/0283573 A1 * | 12/2007 | Levsen | | 30/276 |
| 2007/0283574 A1 * | 12/2007 | Levsen | | 30/276 |
| 2008/0098605 A1 * | 5/2008 | Whited et al. | | 30/276 |
| 2008/0172888 A1 * | 7/2008 | Long et al. | | 30/276 |
| 2008/0183109 A1 | 7/2008 | Babaev | | |
| 2009/0227192 A1 | 9/2009 | Luthi et al. | | |
| 2011/0185580 A1 * | 8/2011 | Whited | | 30/276 |
| 2011/0247220 A1 * | 10/2011 | Whited et al. | | 30/276 |
| 2012/0030952 A1 * | 2/2012 | Levsen | | 30/276 |
| 2012/0079726 A1 * | 4/2012 | Whited | | 30/329 |

OTHER PUBLICATIONS

Extended European Search Report of the European Patent Office dated Aug. 9, 2012 for EPO Divisional Application No. 12170108.0, filed May 30, 2012 (EPO Divisional Application No. 12170108.0 corresponds to and claims priority from the present application) (5 pages).

European Search Report dated May 14, 2011 for European Application No. 11152769.3, filed Jan. 31, 2011 (EPO Application No. 11152769.3 corresponds to and claims priority from the present application) (4 pages).

* cited by examiner

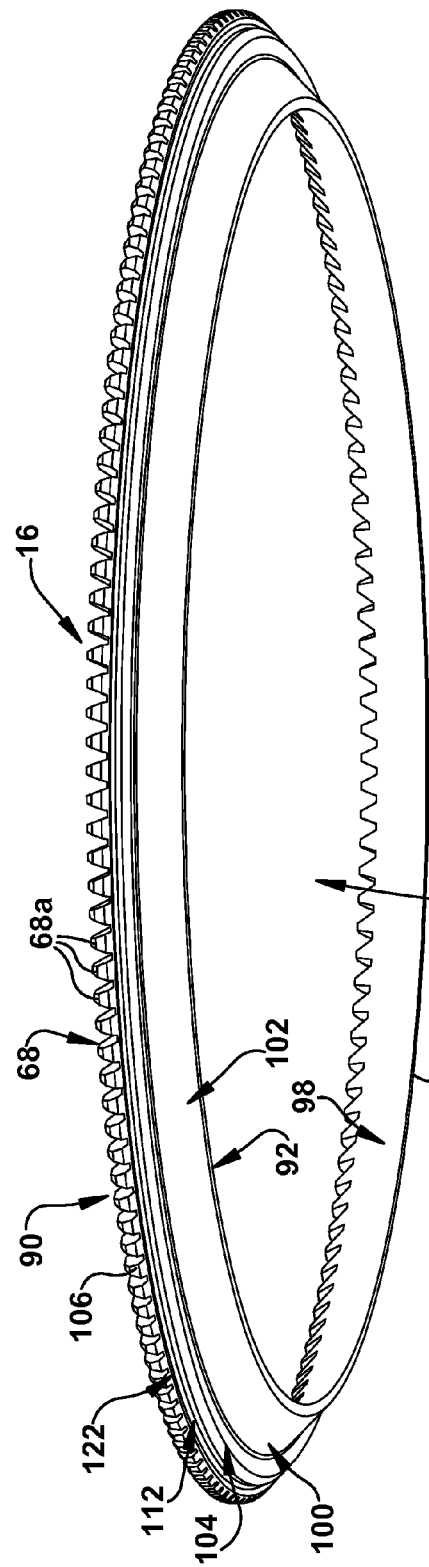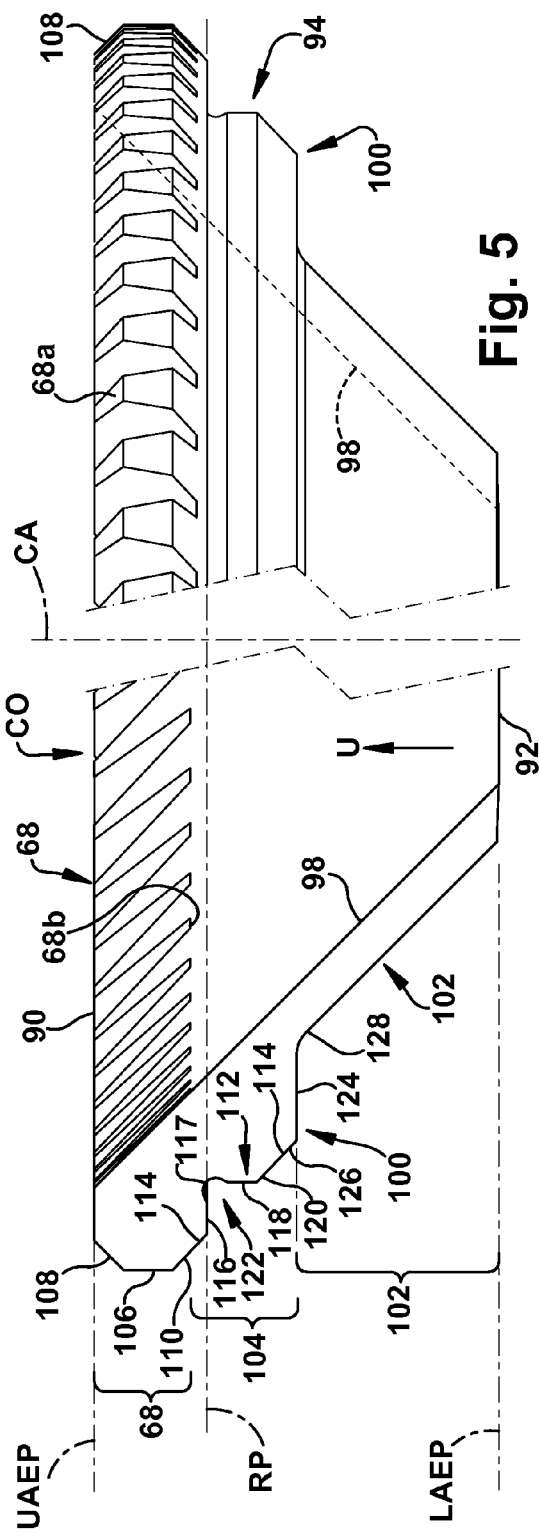

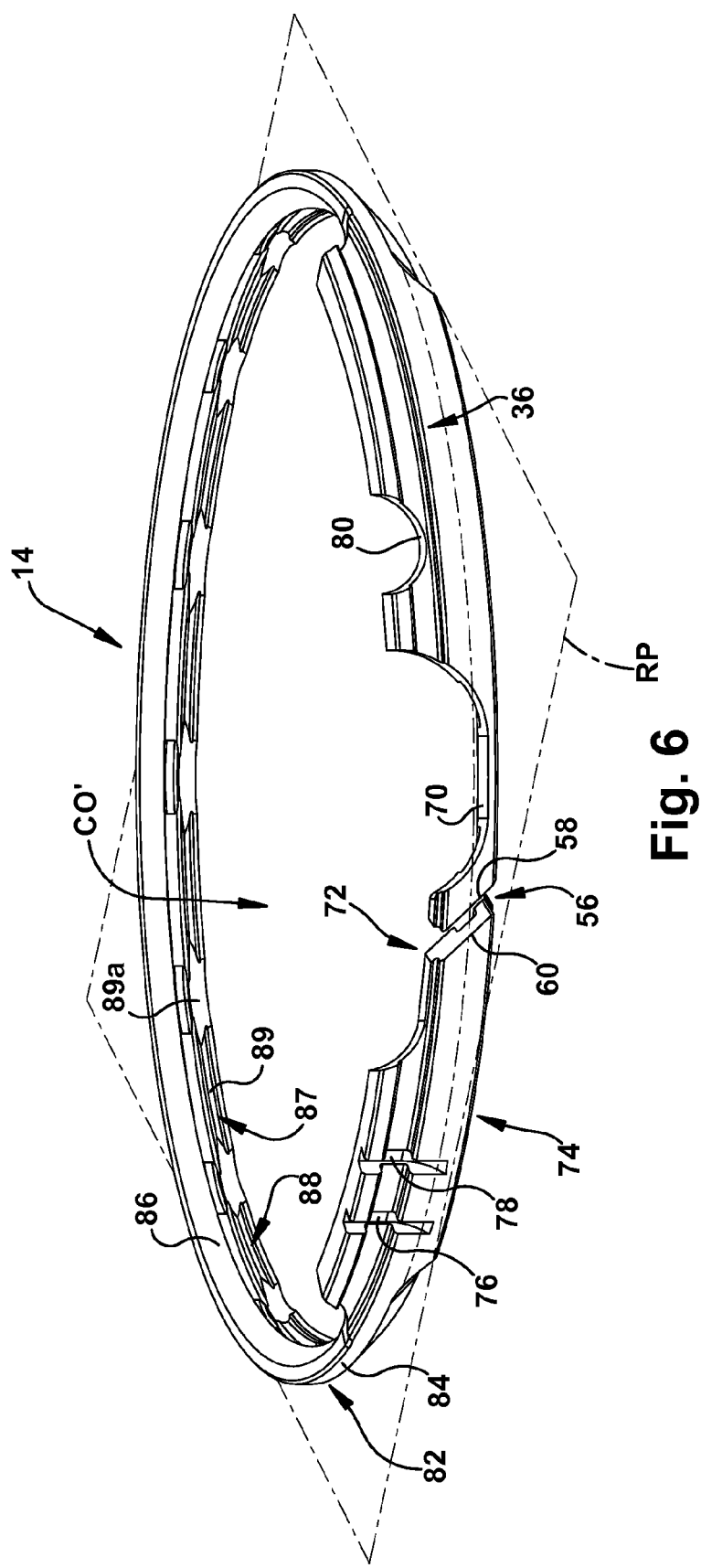

LARGE DIAMETER NOTCHED BLADE AND BLADE HOUSING FOR POWER OPERATED ROTARY KNIFE

TECHNICAL FIELD

The present disclosure relates to a power operated rotary knife have a large diameter, annular rotary knife blade and, more specifically, to a power operated rotary knife having a large diameter, annular rotary knife blade and interfitting blade housing wherein the rotary knife blade includes a notched bearing race providing for an enhanced or enlarged area of bearing contact between the blade bearing race and the corresponding blade housing bearing structure and wherein the enhanced area of bearing contact is offset radially inwardly of and axially from a radial outer surface of a drive gear region of the blade thereby reducing wear on the radial outer surface of the blade drive gear region.

BACKGROUND

Power operated rotary knives are widely used in meat processing facilities for meat cutting and trimming operations. Such power operated rotary knives typically include a handle assembly including a head member extending from the handle assembly, an annular blade housing coupled to the head member via a clamp assembly, and an annular rotary blade supported for rotation by the blade housing. The annular rotary blade of a conventional power operated rotary knife is rotated by a drive mechanism including a flexible drive shaft which extends through an opening in the handle assembly and engages a pinion gear supported in a distal portion of the handle assembly head member. The flexible drive shaft includes a stationary outer sheath and a rotatable interior drive shaft which is driven by a pneumatic or electric motor. Gear teeth of the pinion gear engage mating gear teeth formed on an upper surface of an annular body of the annular rotary blade. A blade section of the rotary blade extends downwardly from the annular body. Upon rotation of the pinion gear by the flexible drive shaft, the annular rotary blade rotates within the blade housing at a high RPM, on the order of 1,500-2,000 RPMs. Conventional power operated rotary knives are disclosed in U.S. Pat. No. 6,354,949 to Baris et al., U.S. Pat. No. 6,751,872 to Whited et al., U.S. Pat. No. 6,769,184 to Whited, and U.S. Pat. No. 6,978,548 to Whited et al., all of which are assigned to the assignee of the present invention and all of which are incorporated herein in their respective entireties by reference.

Depending upon the application, power operated rotary knives are offered in various sizes. Size may be measured in terms of an outer diameter of the annular rotary blade. Typical annular rotary blade may vary in size from, for example, as 1.4 inches to over 7 inches. For a given annular blade rotational speed, e.g., 2000 RPM, it is clear that the linear velocity of an outer surface of the blade bearing against the blade housing increases with increasing blade diameter. As such, problems of wear on the blade bearing surface and vibration of the blade as it rotates within the blade housing are accentuated in power operated rotary knives with large blade diameters. As used herein, rotary knife blades with outer diameters of approximately 5 inches or greater are considered large diameter blades, such blades being particularly prone to the problems discussed herein.

The blade housings of large diameter rotary knives typically include a split blade housing for blade replacement while the blade housing remains attached to the handle assembly head member. The clamping assembly is loosened on one side of the split of the split blade housing thereby allowing one end of the blade housing adjacent the split to be moved away from the other end of the blade housing. Relative movement of the one end of the blade housing away from the other end expands the blade housing diameter and allows removal of a blade and insertion of a new blade, while the other end of the blade housing remains attached to the head member. Upon insertion of a new blade, the blade housing is returned to its unexpanded state and the loosened side of the clamping assembly is tightened to secure the blade housing in place.

Unfortunately, properly returning and securing the blade housing to its unexpanded state tends to be a trial and error procedure, especially for new, untrained operators of a power operated rotary knife. If the blade housing diameter is returned to a diameter that is too small for the blade, the blade will tend to stick or potentially lock up in the blade housing. If the blade housing diameter is returned to a diameter that is too large for the blade, the blade will not be properly supported in the blade housing and will tend to vibrate.

A problem with larger diameter blades involves wear on the radial outermost surface of the blade. In conventional large diameter power operated rotary knives, the radially outermost surface of the blade corresponding to the drive gear region of the blade, that is, the upper region of the blade where the plurality of gear teeth are formed, functions as a bearing surface. As such, the blade housing contacts and bears against the radial outer surface of the drive gear region of the blade. This causes the radially outer surface of the blade drive gear region to wear down as the blade rotates in the blade housing, thereby reducing the effective outer diameter of the blade.

Reducing the outer diameter of the blade in the blade drive gear region causes problems in terms of increased vibration. That is, as the blade outer diameter decreases, the blade becomes looser within the blade housing and hence is prone to vibration within the housing at high rotational speeds. Increased vibration makes the knife more difficult to operate and increases operator fatigue. The operator will either look for another knife or be forced to attempt to adjust the diameter of the blade housing to a smaller diameter to match the decreased blade diameter. Such adjustments or attempted adjustments of the blade housing diameter on the part of the operator decrease operator productivity and increase operator dissatisfaction with the knife, both of which are undesirable results.

In FIG. 13, a section view of a portion of a prior art large diameter power operated rotary knife is shown. The prior art blade 500 and blade housing 502 are shown to schematically illustrate the blade—blade housing bearing structure 504. The prior art bearing structure 504 includes a first, cylindrical bearing surface 506 of the blade housing 502, which bears against a mating cylindrical bearing surface 508 of the blade 500, a second, frustoconical bearing surface 510 of the blade housing 502 which bears against a mating frustoconical bearing surface 512 of the blade 500, and a third, horizontally oriented annular bearing surface 514 of the blade housing 502 which bears against a mating horizontal, annular bearing surface 516 of the blade 500. As can be seen, the first cylindrical bearing surface 508 of the blade 500 includes a radial outer surface of a drive gear section 518 of the blade and the third horizontal annular bearing surface 516 of the blade includes an upper surface of the drive gear section of the blade.

Not all of the mating bearing surfaces of the blade—blade housing are in contact at any given time because there are necessarily running clearances between the blade 500 and the blade housing 502 which allow the blade to rotate relatively freely within the blade housing. These running clearances cause the blade 500 to act somewhat akin to a teeter-totter within the blade housing 502, that is, as one region of the blade is pivoted or moved upwardly within the blade housing during a cutting or trimming operation, the diametrically opposite portion of the blade (180° away) is pivoted or moved downwardly within the blade housing. Accordingly, the mating bearing surfaces in contact at a specific location of the blade—blade housing interface will change and, at any given time, will be determined by the forces applied during use of the rotary knife.

For example, if, when viewed from the perspective of the operator, the right side of the blade 500 is being used for cutting or trimming meat, i.e., the region labeled T in FIG. 2, the blade edge 520 in the region T (the loaded side of the blade) will transmit a force vector along the blade generally in the direction labeled F in FIG. 13. This will cause the mating blade housing—blade bearing surfaces 506, 508 and the mating blade housing—blade bearing surfaces 514, 516 to be moved into contact to restrain the blade 500 within the blade housing 502, i.e., the blade housing bearing surfaces 514, 506 restrain upward and radial outward movement of the blade with respect to the blade housing, respectively. At the same time, the diametrically opposite region of the blade 500, the region labeled O in FIG. 2, that is, the unloaded side of the blade, will experience a force vector in a direction F' which is generally perpendicular to the direction F shown in FIG. 13, that is, bearing against the blade housing bearing surface 510. The blade 500 will tend to move generally downwardly and radially inwardly within the blade housing 502, thus, the blade housing—blade bearing surfaces 510, 512 will be in contact in to restrain movement of the blade within the housing in the region O. At that same time, in the region O, the blade housing—blade bearing surfaces 514, 516 and 506, 508 may not be in contact because of the teeter-tooter pivoting of the blade within the housing.

A problem with the prior art bearing structure shown in FIG. 13 is that the cylindrical blade bearing surface 508 is comprised of a plurality of gear teeth, that is, the radial surface 508 has gaps between each pair of adjacent gear teeth, for example, adjacent gear teeth 522, 524 have a gap 526 between them. Because of the gaps in the cylindrical blade bearing surface 508 and the small axial height of that surface on the order of 0.034 inch, the area of the bearing surface 508 is small. Given the large loading forces applied to the cylindrical surface 508 during cutting and trimming operations, in the prior art design, the radial outer surface of the prior art blade 500 will wear rapidly during use.

As the radial outer surface 508 is the largest outer diameter of the blade 500, the result of such wear of the radial outer surface 508 is that the blade 500 outer diameter will decrease and the blade will tend to vibrate in the blade housing 502. As the radial outer surface 508 wears, the blade 500 becomes looser and looser within the blade housing 502. Increasing vibration will result in greater operator fatigue and lower productivity. An inexperienced operator may simply accept the increased vibration as a necessary part of using a power operated knife and reduce productivity by cutting slower, turning the knife off, taking additional time between cuts, etc.

An experienced operator may recognize that a potential solution to the problem of increased vibration is to adjust, that is, reduce the blade housing diameter to account for the decreased outer diameter of the blade. As described above, adjustment of the blade housing diameter involves loosening the clamping screw 65, using a screwdriver or other tool to leverage the slot 76 against the head member 24 to adjust blade housing diameter, and then tightening the clamping screw. There are numerous problems with this approach. First, it is a trial and error technique that requires the operator to find a suitable blade housing diameter. For example, if the blade housing diameter is made too small, the blade may lock up in the housing. Second, even if the operator is successful in adjusting the blade housing to an acceptable diameter, valuable working time has been lost in the adjustment process. Finally, since wear of the radial outer surface 508 of the blade 500 is ongoing, the adjustment is only a temporary fix as further wear occurs.

What is needed is a blade—blade housing bearing structure for large diameter power operated rotary knives that results in less wear in the radial outermost surface of the blade, that is, less wear in the radial outer surface of the blade drive gear region. What is also needed is a blade—blade housing bearing structure for large diameter power operated rotary knives that results in less vibration of the knife as the knife is used. What is also needed is a blade—blade housing bearing structure that is less sensitive to blade housing diameter adjustment errors and/or requires less blade housing diameter adjustments.

SUMMARY

In one aspect, the present disclosure relates to a rotary knife blade for a power operated rotary knife including a rotatable annular body disposed about a central axis and bounded by an upper axial end, an axially spaced apart lower axial end, an inner wall, and a radially spaced apart outer wall, the annular body including an annular drive gear section adjacent the upper axial end adapted to be rotatably driven by a pinion gear, an annular blade section adjacent the lower axial end, and an annular middle bearing race section extending axially therebetween; the drive gear section comprising a plurality of spaced apart gear teeth extending downwardly from the upper axial end and extending between and through the outer wall and the inner wall, a first portion of the outer wall corresponding to the drive gear section being generally cylindrical; the middle section defining a bearing race in a second portion of the outer wall corresponding to the middle section, the outer wall second portion being generally frustoconical, converging in a direction proceeding toward the lower axial end, the bearing race comprising a notch extending radially inwardly from the outer wall frustoconical second portion defining first and second bearing surfaces and a region of the outer wall frustoconical second portion adjacent and below the notch defining a third bearing surface, the first bearing surface substantially parallel to a plane defined by the upper axial end and orthogonal to the annular body central axis, the second bearing surface substantially orthogonal to the first bearing surface and parallel to the annular body central axis, and the third bearing surface transverse to the first and second bearing surfaces and the annular body central axis; and the blade section extending downwardly and radially inwardly from the middle section, a portion of the outer wall corresponding to the blade section being stepped radially inwardly from the portion of the outer wall corresponding to the middle section and being generally frustoconical, converging in a direction proceeding toward the lower axial end, the blade section defining a cutting edge at the lower axial end.

In one exemplary embodiment, the inner wall extending between the upper axial end and the lower axial end is generally frustoconical converging in a direction proceeding toward the lower axial end. In another exemplary embodiment, an angle of the portion of the frustoconical outer wall corresponding to the middle bearing race section with respect to the central axis is substantially the same as an angle of the portion of the frustoconical outer wall corresponding to the blade section. In another exemplary embodiment, an angle of the frustoconical inner wall with respect to the central axis is substantially the same as the angle of the portion of the frustoconical outer wall corresponding to the middle bearing race section with respect to the central axis. In another exemplary embodiment, an angle of the frustoconical inner wall with respect to the central axis is substantially the same as an angle of the portion of the frustoconical outer wall corresponding to the blade section. In another exemplary embodiment, the generally cylindrical surface of the outer wall portion corresponding to the gear section is substantially parallel to the central axis.

In another aspect, the present disclosure relates to a combination of a rotary knife blade and blade housing for a power operated rotary knife, the combination comprising an annular knife blade and a split blade housing configured to support the annular knife blade for rotation therein, the annular knife blade including a rotatable annular body disposed about a central axis and bounded by an upper axial end, an axially spaced apart lower axial end, an inner wall, and a radially spaced apart outer wall, the annular body including an annular drive gear section adjacent the upper axial end adapted to be rotatably driven by a pinion gear, an annular blade section adjacent the lower axial end, and an annular middle bearing race section extending axially therebetween; the drive gear section comprising a plurality of spaced apart gear teeth extending downwardly from the upper axial end and extending between and through the outer wall and the inner wall, a portion of the outer wall corresponding to the drive gear section being generally cylindrical; the middle section comprising a bearing race extending radially inwardly in a portion of the outer wall in the middle section, the bearing race defined by a first bearing surface substantially parallel to a plane defined by the upper axial end and orthogonal to the annular body central axis and a second bearing surface substantially orthogonal to the first bearing surface and parallel to the annular body central axis, the portion of the outer wall corresponding to the middle section being generally frustoconical, converging in a direction proceeding toward the lower axial end; and the blade section extending downwardly and radially inwardly from the middle section, a portion of the outer wall corresponding to the blade section being stepped radially inwardly from the portion of the outer wall corresponding to the middle section and being generally frustoconical, converging in a direction proceeding toward the lower axial end, the blade section defining a cutting edge at the lower axial end; the blade housing including a mounting section and an annular blade support section, the blade support section including an outer wall and a radially spaced apart inner wall, the inner wall defining an annular recess sized to receive the drive gear section of the rotary knife blade annular body and a radially inwardly projecting bearing structure disposed below the annular recess, the bearing structure including a first bearing surface engaging the first bearing surface of the rotary knife blade bearing race, a second bearing surface engaging the second bearing surface of the rotary knife blade bearing race, and a third bearing surface engaging the third bearing surface of the rotary knife blade bearing surface.

In one exemplary embodiment, the inner wall of the rotary knife blade extending between the upper axial end and the lower axial end is generally frustoconical converging in a direction proceeding toward the lower axial end. In another exemplary embodiment, an angle of the portion of the frustoconical outer wall of the rotary knife blade corresponding to the middle bearing race section with respect to the central axis is substantially the same as an angle of the portion of the frustoconical outer wall corresponding to the blade section. In another exemplary embodiment, an angle of the frustoconical inner wall of the rotary knife blade with respect to the central axis is substantially the same as the angle of the portion of the frustoconical outer wall corresponding to the middle bearing race section with respect to the central axis. In another exemplary embodiment, an angle of the frustoconical inner wall of the rotary knife blade with respect to the central axis is substantially the same as an angle of the portion of the frustoconical outer wall corresponding to the blade section. In another exemplary embodiment, the generally cylindrical surface of the outer wall portion corresponding to the gear section of the rotary knife blade is substantially parallel to the central axis. In another exemplary embodiment, the bearing structure of the blade housing is defined by a plurality of circumferentially spaced apart bearing projections formed in the annular blade support section. In another exemplary embodiment, the mounting section of the blade housing includes a circularly curved wall adapted to be mounted to the power operated rotary knife and a split extends centrally through the mounting section.

In another aspect, the present disclosure relates to a power operated rotary knife comprising an annular knife blade; a split blade housing configured to support the annular knife blade for rotation therein; a handle assembly including a head member; and a clamping assembly for securing the blade housing to the handle assembly head member; the annular knife blade including a rotatable annular body disposed about a central axis and bounded by an upper axial end, an axially spaced apart lower axial end, an inner wall, and a radially spaced apart outer wall, the annular body including an annular drive gear section adjacent the upper axial end adapted to be rotatably driven by a pinion gear, an annular blade section adjacent the lower axial end, and an annular middle bearing race section extending axially therebetween; the drive gear section comprising a plurality of spaced apart gear teeth extending downwardly from the upper axial end and extending between and through the outer wall and the inner wall, a portion of the outer wall corresponding to the drive gear section being generally cylindrical; the middle section comprising a bearing race extending radially inwardly in a portion of the outer wall in the middle section, the bearing race defined by a first bearing surface substantially parallel to a plane defined by the upper axial end and orthogonal to the annular body central axis and a second bearing surface substantially orthogonal to the first bearing surface and parallel to the annular body central axis, the portion of the outer wall corresponding to the middle section being generally frustoconical, converging in a direction proceeding toward the lower axial end; and the blade section extending downwardly and radially inwardly from the middle section, a portion of the outer wall corresponding to the blade section being stepped radially inwardly from the portion of the outer wall corresponding to the middle section and being generally frustoconical, converging in a direction proceeding toward the lower axial end, the blade section defining a cutting edge at the lower axial end; the blade housing including a mounting section and an annular blade support section, the mounting section being disposed between the clamping assembly and the handle assembly head member to secure the blade housing to the handle assembly, the blade support section including an outer wall and a radially spaced apart inner wall, the inner wall defining an annular recess sized to receive the drive gear section of the rotary knife blade annular body and a radially inwardly projecting bearing structure disposed below the annular recess, the bearing structure including a first bearing surface engaging the first bearing surface of the rotary knife blade bearing race, a second bearing surface engaging the second bearing surface of the rotary knife blade bearing race, and a third bearing surface engaging the third bearing surface of the rotary knife blade bearing surface.

In one exemplary embodiment, the inner wall of the rotary knife blade extending between the upper axial end and the lower axial end is generally frustoconical converging in a direction proceeding toward the lower axial end. In another exemplary embodiment, an angle of the portion of the frustoconical outer wall of the rotary knife blade corresponding to the middle bearing race section with respect to the central axis is substantially the same as an angle of the portion of the frustoconical outer wall corresponding to the blade section. In another exemplary embodiment, an angle of the frustoconical inner wall of the rotary knife blade with respect to the central axis is substantially the same as the angle of the portion of the frustoconical outer wall corresponding to the middle bearing race section with respect to the central axis. In another exemplary embodiment, an angle of the frustoconical inner wall of the rotary knife blade with respect to the central axis is substantially the same as an angle of the portion of the frustoconical outer wall corresponding to the blade section. In another exemplary embodiment, the generally cylindrical surface of the outer wall portion corresponding to the gear section of the rotary knife blade is substantially parallel to the central axis. In another exemplary embodiment, the bearing structure of the blade housing is defined by a plurality of circumferentially spaced apart bearing projections formed in the annular blade support section. In another exemplary embodiment, the mounting section of the blade housing includes a circularly curved wall adapted to be mounted to the power operated rotary knife and a split extends centrally through the mounting section.

BRIEF DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which:

FIG. 4 is a schematic perspective view of an annular rotary knife blade of the power operated rotary knife of FIG. 1;

FIG. 5 is a schematic front plan view of the annular rotary knife blade of FIG. 4;

FIG. 6 is a schematic rear perspective view of a blade housing of the power operated rotary knife of FIG. 1;

DETAILED DESCRIPTION

The present disclosure relates to a power operated rotary knife having a large diameter, annular rotary knife blade and interfitting or mating blade housing wherein the rotary knife blade includes a notched bearing race providing for an enhanced or enlarged area of bearing contact between the blade bearing race and the corresponding blade housing bearing structure and wherein the enhanced area of bearing contact is offset radially inwardly of and axially from a radial outer surface of a drive gear region of the blade thereby reducing wear on the radial outer surface of the blade drive gear region. As used herein, a large diameter knife blade or a large diameter power operated rotary knife shall refer to a power operated rotary knife including an annular rotary blade having an outer diameter of approximately 5 inches or greater. Such rotary knife blades are particularly prone to the problems of vibration and outer diameter wear discussed above. Advantageously, such problems are mitigated by the blade and blade housing designs of the present disclosure. Such large diameter, power operated rotary knifes are especially suitable for trimming and cutting operations wherein a wide cut or trim layer is desired, for example, trimming wide layers skin or fat from a larger, generally flat piece of meat.

First Exemplary Embodiment of Rotary Knife 10

Figure 1:
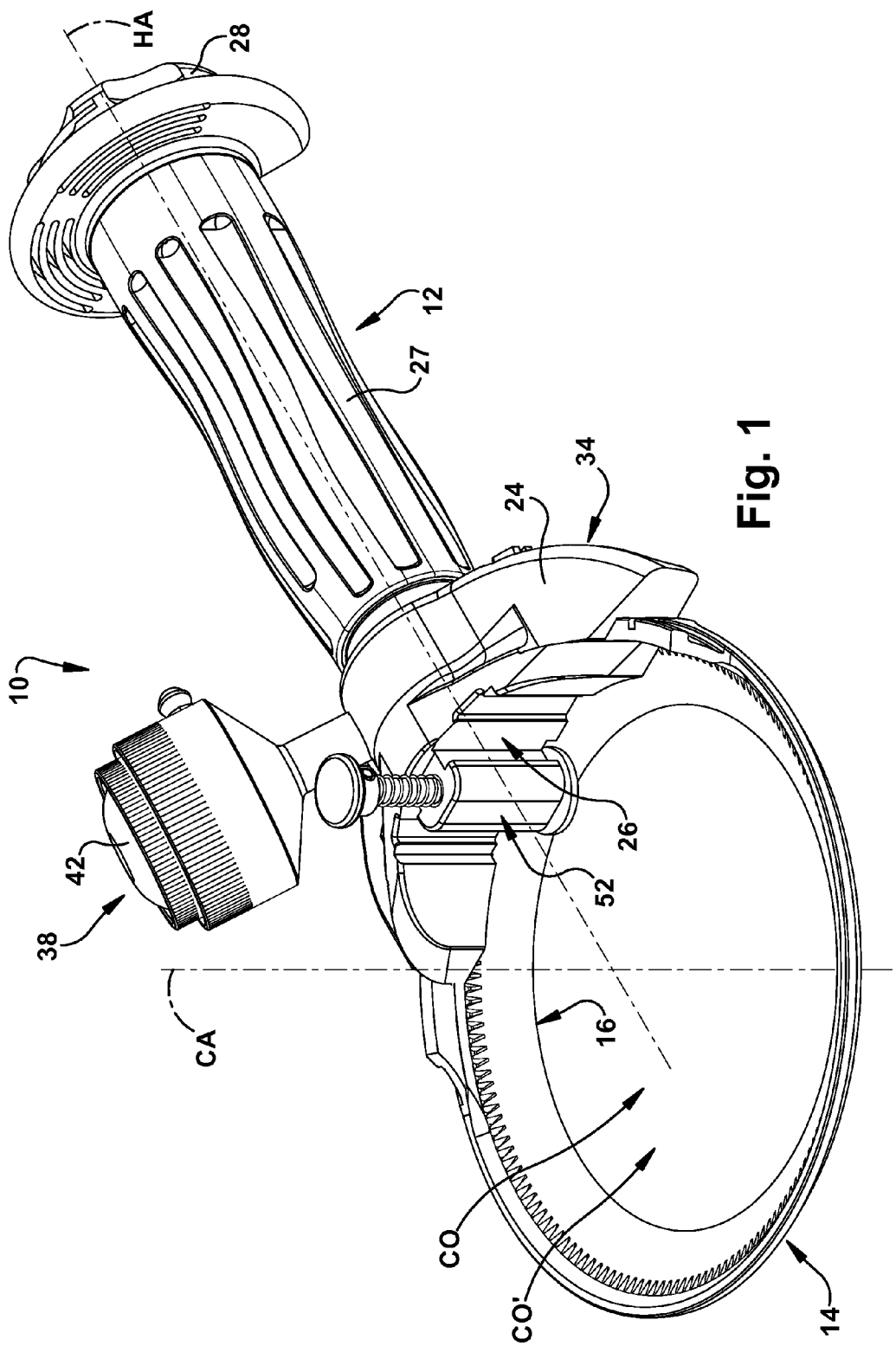
FIG. 1 is a schematic perspective view of a first exemplary embodiment of a large diameter, power operated rotary knife of the present disclosure.
Figure 2:
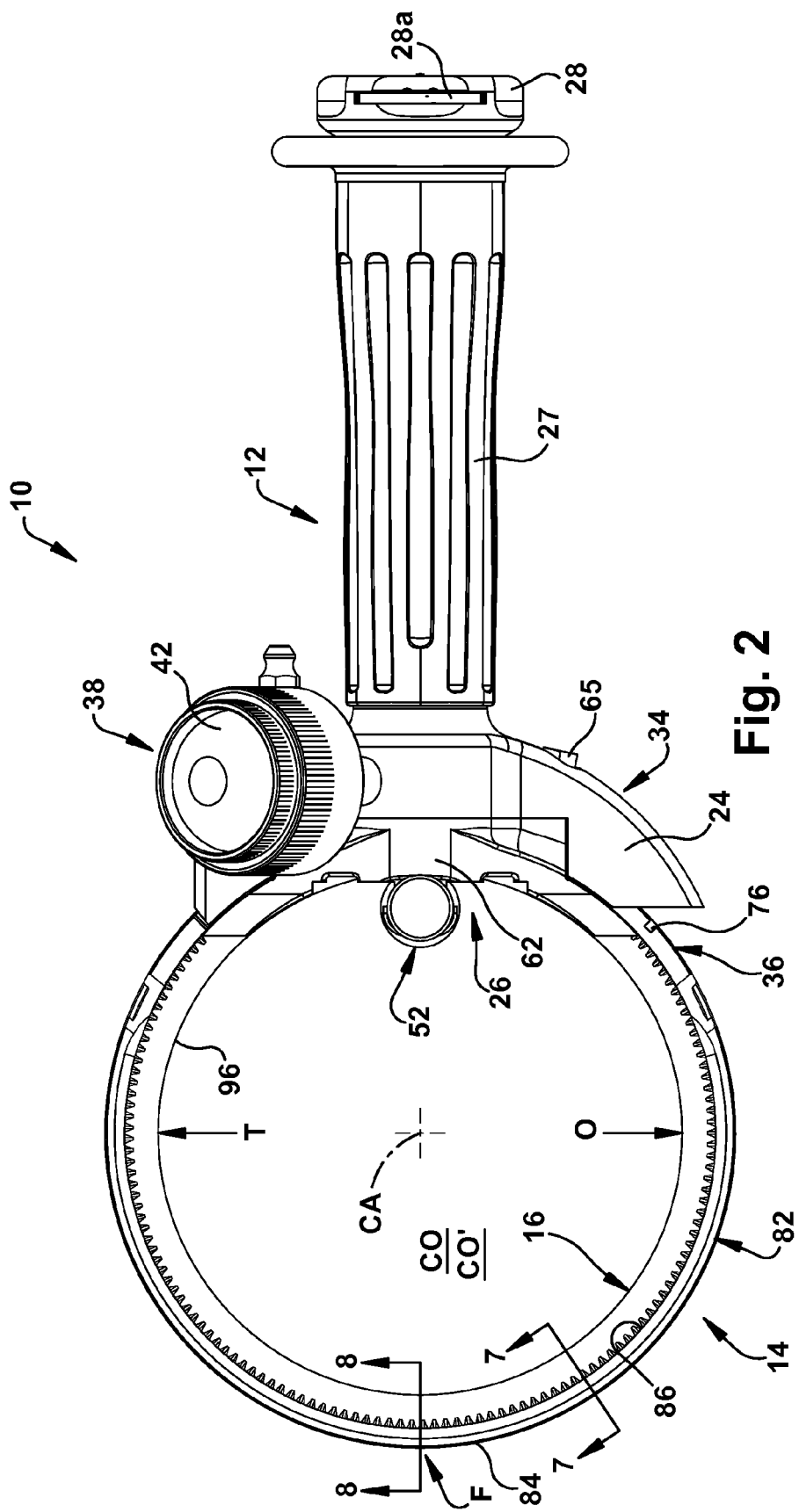
FIG. 2 is a schematic top plan view of the power operated knife of FIG. 1.
Figure 3:
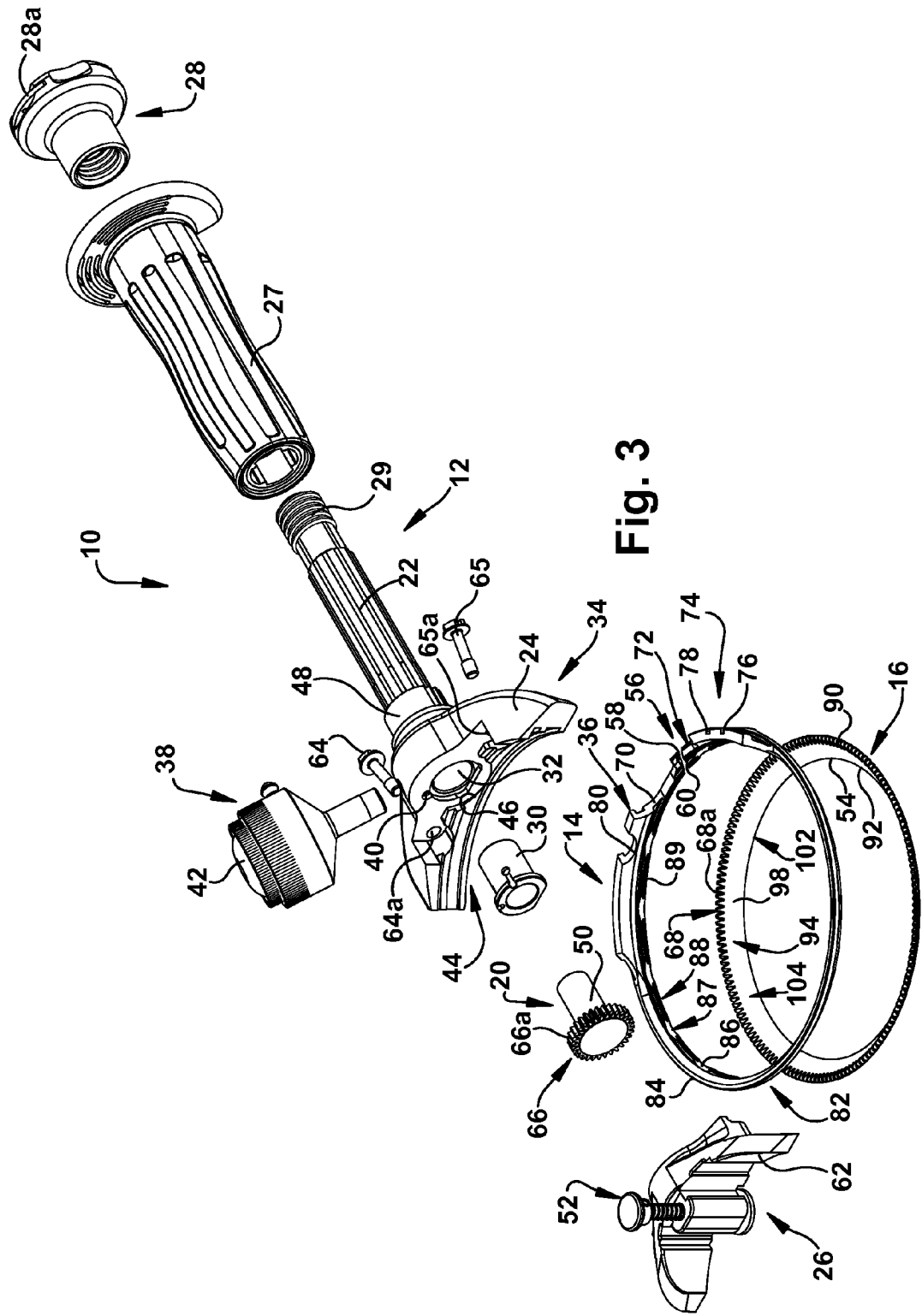
FIG. 3 is a schematic exploded perspective view of the power operated rotary knife of FIG. 1.

Turning to the drawings, one exemplary embodiment of a power operated rotary knife of the present disclosure is shown generally at 10 in FIGS. 1-3. The power operated rotary knife 10 includes a handle assembly 12, a generally annular split blade housing 14 supported by the handle assembly 12 and an annular rotary knife blade 16 supported by the blade housing 14 for rotation about a central axis of rotation CA (FIGS. 1 & 2). The central axis of rotation CA of the blade 16, when the blade is mounted in the blade housing 14 for rotation therein, is substantially congruent with a central axis of the blade housing 14. As used herein, axial, longitudinal, upper and lower shall mean movement or a dimension in a direction along or parallel to an extent of the central axis CA.

Rotation of the rotary blade 16 is provided by a drive mechanism which includes a remote electric motor and a flexible drive shaft (not shown) which operate to rotate a drive or pinion gear 20 supported for rotation within the handle assembly 12. It should be appreciated that other means may be employed to drive the pinion gear 20. For example, an air motor or electric motor may be mounted in the handle assembly to drive the pinion gear 20.

The handle assembly 12 includes a handle supporting, longitudinal frame member 22 and a head member 24 affixed to and extending from the frame member 22. The blade housing 14 is releasably mounted to the head member 24 via a clamping assembly 26. The frame member 22 extends away from the blade 16 along a handle axis HA (FIG. 1) that is substantially orthogonal to the blade central axis CA allowing an operator of the knife 10 to wield the knife with one hand. The frame member 22 supports a hand grip 27 that provides a gripping surface for the operator. The frame member 22 is adapted to receive various size and style hand grips to permit individual operators to select a hand grip which is most comfortable for the specific trimming/cutting application to be performed and the operator's hand size. A connector 28 screws into a threaded rear end portion of the frame member 22 to secure the hand grip 27 on the frame member. The connector 28 additionally includes a movable fastener 28a that secures a drive end portion of the flexible drive shaft within the frame member 22 to drive the pinion gear 20.

As can best be seen in FIG. 3, the frame member 22 rigidly supports the head member 24, the pinion gear 20 and a pinion gear bearing 30 while providing a channel 32 through which the flexible drive shaft extends to make a driving connection with the pinion gear 20. A head assembly 34 includes the head member 24 and the clamping assembly 26 which coact to detachably affix a mounting section 36 of the blade housing 14 to the head member 24. In one exemplary embodiment, the head assembly 34 additionally includes a lubrication system 38 that includes a supply of edible lubricant that is applied to the pinion gear 20 via a port 40 in the head member 24 when the operator depresses a bladder 42 of the lubrication system 38.

The head member 24 positions the blade housing 14 relative to the handle assembly 12. The head member 24 is a generally crescent shaped body that defines an arcuate blade housing seating region 44, a clamp assembly receiving, socket-like cavity 46 and a boss 48 that surrounds the frame member 22 and projects from the head member opposite to the cavity 46 and seating region 44. The pinion gear bearing 30 is a tubular member that is fixed in the channel 32 of the frame member 22 and surrounds a shank 50 of the pinion gear 20. In one exemplary embodiment, the clamping assembly 26 includes a steeling mechanism 52 by which a cutting edge 54 of the blade 16 can be straightened during operation of the knife 10.

In one exemplary embodiment, the handle frame member 22 may be fabricated of plastic or aluminum, the head member 24 may be fabricated of an aluminum casting, the clamp body 62 may be fabricated of stainless steel, and the blade 16 and blade housing 16 may be fabricated of a hardenable grade of alloy steel or a hardenable grade of stainless steel.

Blade Removal

Figure 9:
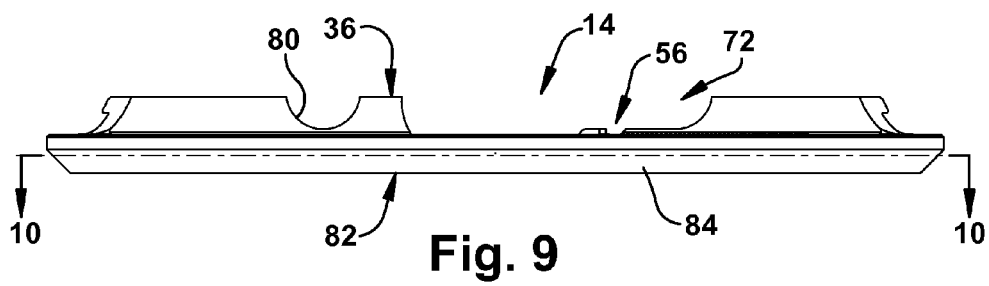
FIG. 9 is a schematic front perspective view of the blade housing of FIG. 6.

As can best be seen in FIGS. 3, 6 & 9, the mounting section 36 of the blade housing 14 includes an angled split 56 defined between end portions 58, 60. The split 56 of the blade housing 14, together with the configuration of the head member 24 and the clamping assembly 26 advantageously provide for the blade 16 being removed from the blade housing without the necessity of removing the blade housing 14 from the head member 24. The clamp assembly 26 firmly maintains the blade housing mounting portion 36 seated against the seating region 44 of the head member 24 to rigidly position the blade 16 within the blade housing 14 while covering the pinion gear 20 which would otherwise be exposed to meat, fat, bone chips, etc. during use of the knife 10. As can be seen in FIG. 3, the clamp assembly 26 comprises a clamp body 62 and clamping screws 64, 65. The clamp body 62 defines a semicircular recess confronting the head member 24 for receiving a gear portion 66 of the pinion gear 20. The gear portion 66 of the pinion gear 30 defines a plurality of peripherally or radially spaced apart gear teeth 66a which interfit and mesh with a plurality of peripherally spaced apart gear teeth 68a of a drive gear section 68 of the blade 16 to rotate the blade 16 within the blade housing 14.

The clamping screws 64, 65 extend through respective holes 64a, 65a in the rear side of the head member 24 and into respective tapped holes in the clamp body 62. The clamping screws 64, 65 are tightened to clamp the clamp body 62 against the blade housing mounting section 36. The mounting section 36 includes a generally semicircular recess 70 that provides clearance for the gear portion 66 of the pinion gear 20 and a reduced height region 72 adjacent to the semicircular recess 70. As can be seen in FIG. 6, the split 56 is radially offset from the semicircular recess 70.

As can be seen in FIG. 6, the end portions 58, 60 adjacent the angled split 56 are within the reduced height region 72 of the mounting section 36. This is part of an expansion structure 74 that enables the blade housing 14 to be resiliently expanded, while still connected to the head member 24 to allow removal and replacement of the rotary knife blade 16. The expansion structure 74 further includes pair of radially spaced apart slots 76, 78 in an outer peripheral surface of the mounting section 36.

A boss of the clamp body 62 extends through an arcuate notch 80 in the mounting section 36. The notch 80 closely conforms to the shape of the clamp body boss such that when the clamping screw 64 is threaded into its respective clamp body threaded opening, the clamp body boss extends through the notch 80 and prevents the end portion 58 of the blade housing 14 from moving with respect to the clamp body 62 or the head member 24. When the clamping screw 65 is threaded into its respective clamp body threaded opening, the end portion 60 is also prevented from moving with respect to the clamp body 62 or the head member 24.

When it is desired to change the blade 16, the clamping screw 65 is partially, but not completely, loosened, thus maintaining some tension in the clamping screw 65 and, therefore, some clamping force applied to the blade housing 14. A screwdriver, or equivalent tool, is inserted in the slot 76 and levered against the head member 24 to resiliently expand the blade housing diameter. The screwdriver is then removed from the slot 76 and inserted into the slot 78 and levered against the head member 24 to further resiliently expand the blade housing diameter. Since the end portion 60 is in the reduced height section 72 of the mounting section 36, the end portion 60 is able to move peripherally away from the stationary end portion 58. Because the clamping screw 65 is only partially loosened and some clamping force on the blade housing 14 remains, thus, the blade housing 14 does not snap back or return to its unexpanded diameter. After the blade 16 has been replaced, the screwdriver and the slots 76, 78 are used to return the blade housing to its unexpanded diameter and the clamping screw 65 is tightened to complete the blade changing process. Additional details of the expansion structure 74, the blade housing mounting section 36, the angled blade housing split 56, the head member 24 and the clamp body 62 that provides for securement of the blade housing to the head member 24 and provides for expansion of the blade housing diameter for blade changing blade is found in U.S. published patent application publication no. U.S. 2008/0098605 A1, published May 1, 2008 (Ser. No. 11/588,572, filed Oct. 27, 2006), entitled "Split Blade Housing for Power Operated Rotary Knife" to Whited et al. U.S. published patent application publication no. U.S. 2008/0098605 is assigned to the assignee of the present application and is incorporated herein by in its entirety.

Blade Housing Blade Support Section 82

In addition to the mounting section 36, the blade housing 14 further includes a blade support section 82 that extends from the mounting section 36 and forms an annular ring for supporting the blade 16. As can best be seen in FIGS. 6 & 7, the blade support section 82 includes an outer wall 84 and a radially spaced apart inner wall 86. The inner wall 86 defines a radially extending annular opening 87 which receives the blade 16 for rotation and defines a rotational plane RP of the knife blade, the rotational plane RP being substantially orthogonal to the central axis CA of the blade. The inner wall 86 of the blade support section also defines an axially extending central opening CO' such that material that is cut by the cutting edge 54 of the blade 16 flows in an upward direction U (FIG. 5) upwardly through a central opening CO of the blade and also through the central opening CO' of the blade housing where it exits the rotary knife 10.

The blade 16 is supported for rotation by a bearing structure 88 of the blade housing blade support section 82. The bearing structure 88 is defined by a portion of the inner wall 86 defining the annular opening 87. As can best be seen in the sectional view of FIG. 10, the blade support structure annular opening 87 and the bearing structure 88 extend around the entirety of the blade housing 14, including extending through the mounting section 36. Specifically, the bearing structure 88 includes a plurality of spaced apart bearing projections 89. Disposed between each of the spaced apart bearing projections 89 are radially recessed regions 89a (best seen in FIGS. 3, 6 & 10) which facilitate the draining/exiting of pieces of fat, pieces of meat and/or bone, and/or other cutting debris which may become trapped and build up in the annular opening 87 during operation of the knife 10.

Figure 10:
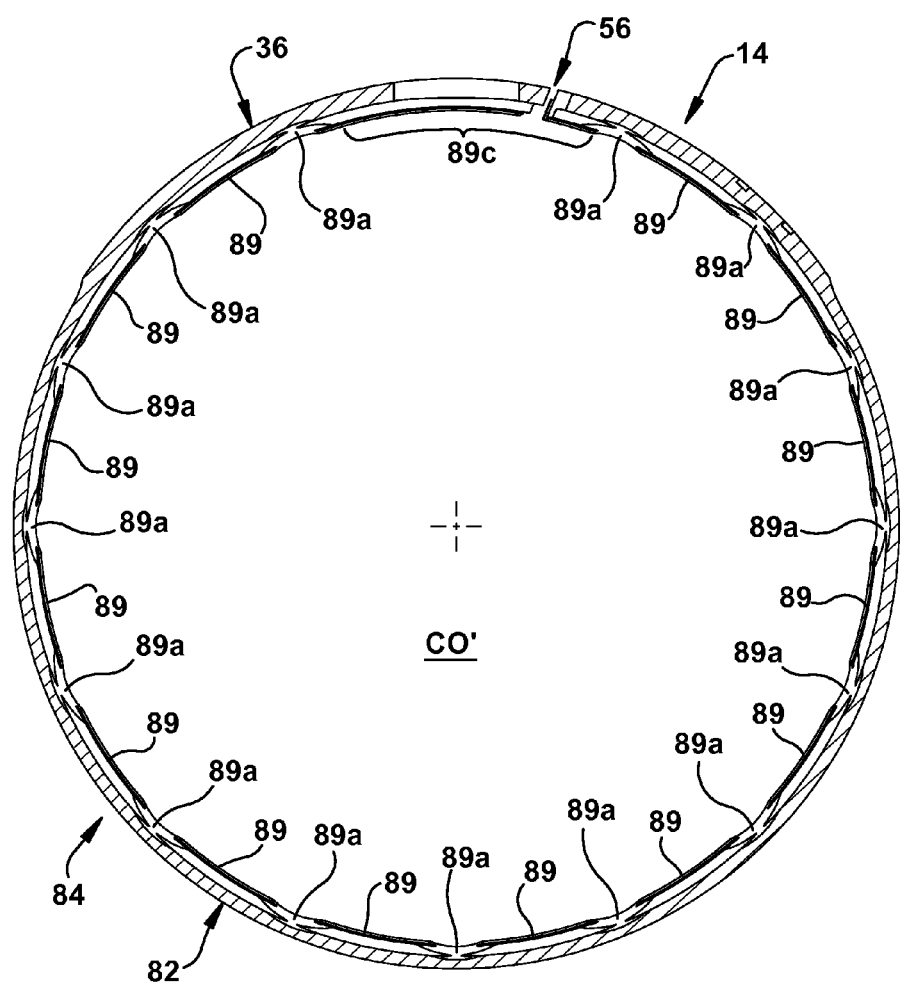
FIG. 10 is a schematic sectional view of the rotary knife housing of FIGS. 6 and 9 as seen from a plane indicated by the line 10-10 in FIG. 9.

In one exemplary embodiment shown in FIG. 10, the bearing structure 88 includes fifteen bearing projections 89 and fifteen recesses 89a. It has been found that this specific combination and spacing of bearing projections 89 and recessed drain/exit regions 89a is most suitable for blade 16 stability and reduced vibration within the blade housing 16 and for facilitating the draining/exiting of cutting debris from the annular opening 87. The fifteen recesses 89 each subtend an angle of approximately 11°, while fourteen of the fifteen bearing projections 89 subtend an angle of approximately 11.5°. The fifteenth bearing projection, which bridges the blade housing split 56 and is labeled 89c in FIG. 10, is radially larger than the remaining fourteen bearing projections and subtends an angle of approximately 34°. It has also been found that having a bearing projection 89 bridging the recess 56 of the blade housing 14 is advantageous in terms of blade stability and reduced vibration of the blade 16 within the blade housing 14.

Rotary Blade 16

Figure 7:
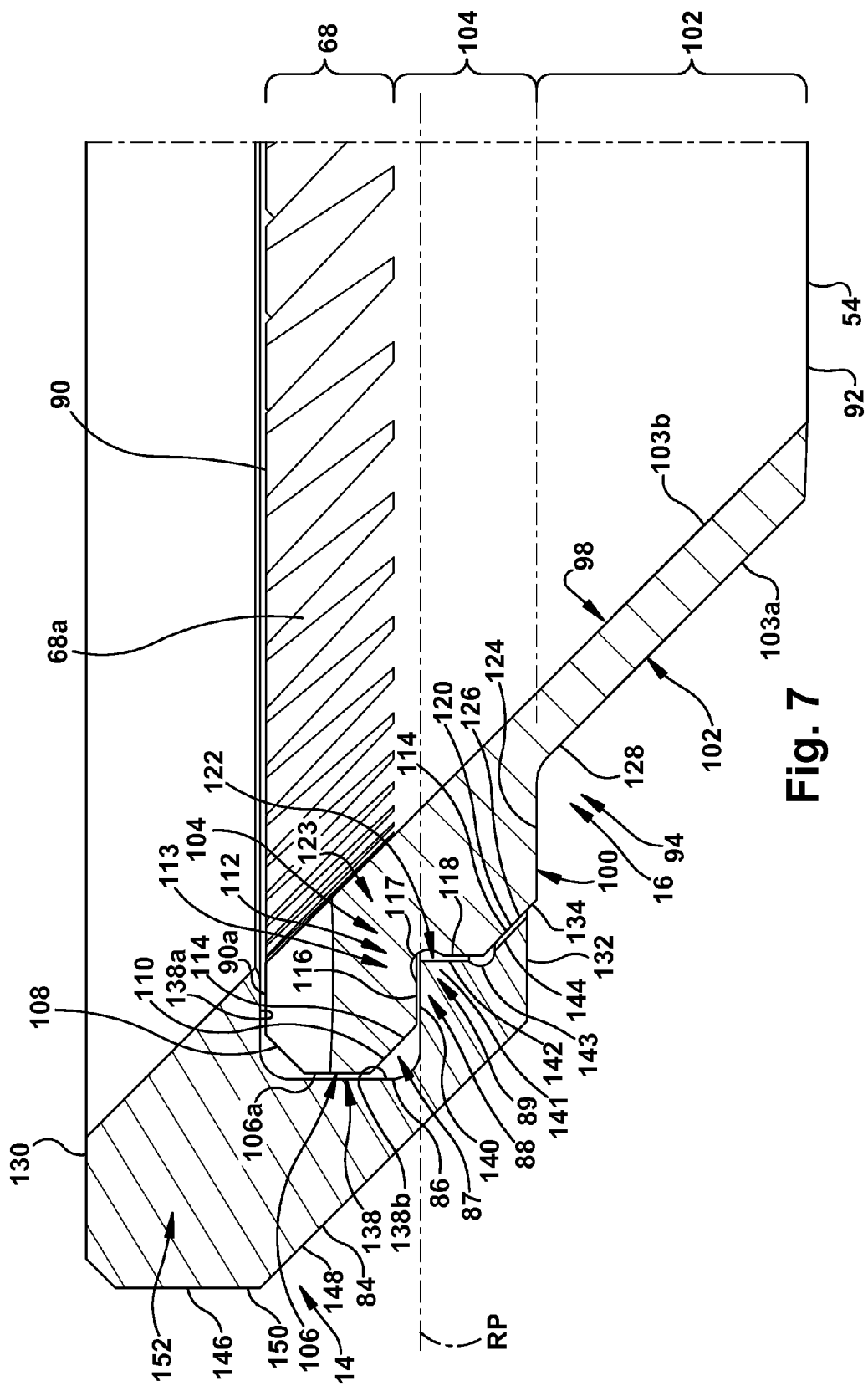
FIG. 7 is a schematic sectional view of the rotary knife blade and the mating blade housing of the power operated rotary knife of FIG. 1 as seen from a plane indicated by the line 7-7 in FIG. 2, in a region of a bearing projection of the blade housing.

As can best be seen in FIGS. 4, 5 & 7, the rotary knife blade 16 includes an upper surface or upper axial end 90 and an axially spaced apart a lower surface or lower axial end 92 with a rotatable annular body 94 disposed therebetween. A central axis of the rotatable annular body 94 is congruent with and the same as the blade central axis CA and, for simplicity, both the blade central axis and the annular body central axis shall be referenced herein as CA. The upper axial end 90 includes an upper surface of the plurality of gear teeth 68a, while the lower axial end 92 includes a lower surface of the cutting edge 54 of the blade. The upper axial end 90 defines a generally planar surface UAEP (FIG. 5) and the lower axial end defines a generally planar surface LAEP. The planes UAEP, LAEP are substantially parallel, substantially orthogonal to the blade/annular body central axis CA, and substantially parallel to the rotation plane RP of the blade 16.

The rotatable annular body 94 is disposed about the central axis CA and is bounded by the upper axial end 90, the lower axial end 92, an inner wall 98, and a radially spaced apart outer wall 100. The inner wall 98 of the blade 16 defines the central opening CO of the blade and is angled such that material that is cut by the cutting edge 54 of the blade flows upwardly through and exits the blade. In one exemplary embodiment of the present disclosure, the diameter of the central opening CO at the lower axial end 92 of the blade 16 is approximately 4.4 inches, while the outer diameter of the blade at its largest diameter, which is near the upper axial end 90 is approximately 5 inches. In one exemplary embodiment, an axial height of the blade 16 measured from the upper axial end 90 to the lower axial end 92 is approximately 0.28 inches.

The blade annular body 94 includes: a) the annular drive gear section 68 adjacent the upper axial end 90 which is adapted to be rotatably driven by the pinion gear 20; b) an annular blade section 102 adjacent the lower axial end 92; and c) an annular middle bearing race section 104 extending axially therebetween. The drive gear section 68 of the blade annular body 94 includes the plurality of spaced apart gear teeth 68a which extend downwardly from the upper axial end 90 and further extend between and through the outer wall 100 and the inner wall 98. A first portion 106 of the outer wall 100 corresponding to the drive gear section 68 of the blade 16 is generally cylindrical. As can be seen in FIG. 5, the cylindrical first portion 106 comprises the radial outer surface of a drive gear section or region 68 and also defines the outermost radial surface of the blade 16 and the blade outer wall 100. Disposed axially above the outer wall cylindrical first portion 106 is a short, angled chamfer 108 that is provided for clearance purposes. Disposed below the cylindrical first portion 106 is a short, angled frustoconical portion 110 that transitions to the middle section 104. That is, in axial position, the lower, angled portion 110 corresponds to a very bottom portion 68b of the plurality of gear teeth 68a of the drive gear section 68. However, in terms of the blade outer wall 100, the lower angled portion 110 is more easily understood to be a transition that continues into the middle section 104.

The annular drive gear section 68 adjacent the upper axial end 90 defines two bearing surfaces: 1) a generally vertical bearing surface 106a, defined by a radial outer surface of the plurality of gear teeth 68a and corresponding to the cylindrical first portion 106; and 2) a generally horizontal bearing surface 90a, defined by an upper surface of the plurality of gear teeth 68a and corresponding to the upper axial end 90.

Blade Bearing Race 112

The middle section 104 of the blade annular body 94 defines a bearing structure or race 112 in a second portion 114 of the outer wall 100. The outer wall second portion 114 is generally frustoconical, converging, that is, having a reducing diameter, in a direction proceeding toward the lower axial end 92. The bearing structure or race 112 includes three bearing surfaces or faces 116, 118, 120. The bearing race 112 includes a notch 122 extending radially inwardly from the outer wall frustoconical second portion 114 of the outer wall 100. The notch 122 defines the first and second bearing surfaces 116, 118. The third bearing surface 120 is defined by a region of the frustoconical second portion 114 of the outer wall 100 generally adjacent and spaced axially below the notch 122.

The first bearing surface 116 is substantially parallel to the plane UAEP defined by the upper axial end 90 of the blade 16 and is substantially orthogonal to the annular body/blade central axis CA. The second bearing surface 118 substantially orthogonal to the first bearing surface 116 and is substantially parallel to the annular body central axis CA. The third bearing surface 120 is transverse to the first and second bearing surfaces 116, 118 and is transverse to the blade central axis. Note that between the first and second bearing surfaces 116, 118, there is a small semicircular recess 117 that is provided for clearance purposes.

A bearing structure 113 of the blade 16 includes the vertical bearing surface 106a and the horizontal bearing surface 90a of the annular drive gear section 68 and the first, second and third bearing surfaces 116, 118, 120 of the annular middle bearing race section 104 of the blade.

The annular blade section 102 of the blade annular body 94 extends downwardly and radially inwardly from the middle bearing race section 104. A transition region 124 of the outer wall 100 corresponding to the transition between a lower portion 126 of the middle bearing race section 104 and an upper portion 128 of blade section 102 is stepped radially inwardly from the middle bearing race section 104 to the blade section 102. As to both the inner wall 98 and the outer wall 100, the blade section 102 is generally frustoconical, converging in a direction proceeding toward the lower axial end 92. Stated another way, the blade section outer wall 103a (FIG. 7) and the blade section inner wall 103b are both generally frustoconical and are substantially parallel. The blade section defines the cutting edge 54 of the blade 16 in a region of the lower axial end 92.

Blade Housing Bearing Structure 88

Figure 8:
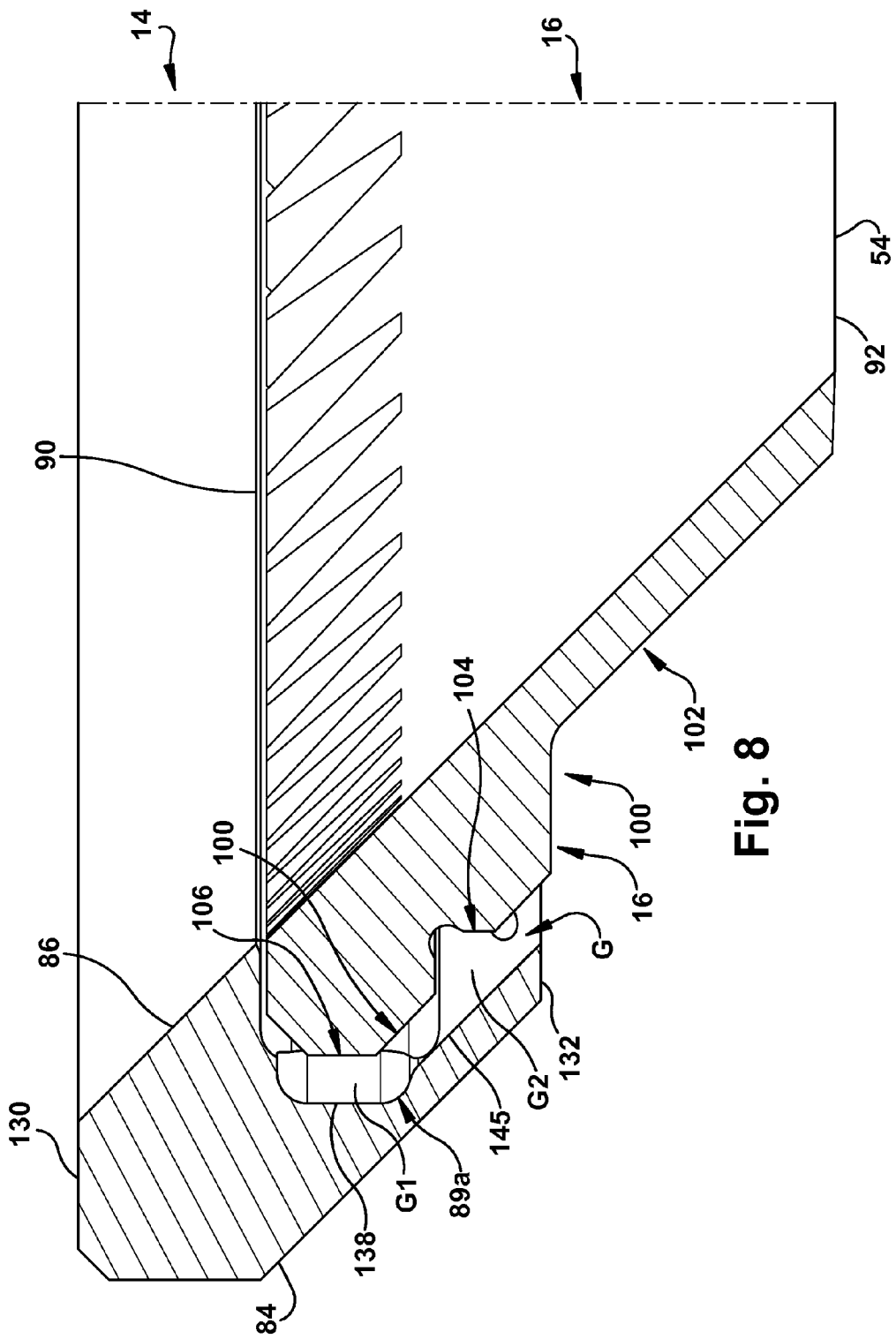
FIG. 8 is a schematic sectional view of the rotary knife blade and the mating blade housing of the power operated rotary knife of FIG. 1 as seen from a plane indicated by the line 8-8 in FIG. 2, in a region of a fat receiving recess of the blade housing.

As can best be seen in FIGS. 7 and 8, the blade housing blade support section 82 supports the blade 16 for rotation in the annular opening 88 defined in the inner wall 86 of the blade housing. The blade housing 14 includes an upper axial end 130 and a lower axial end 132. The upper axial end 130 is generally planar and substantially congruent with the plane defined by the upper axial end 90 of the blade 16. The annular blade section 102 of the blade 16 extends below the lower axial end 130 of the blade housing blade support section 82, as does a small, lower portion 134 of the annular middle bearing race section 104 of the blade 16.

As is best seen in FIG. 7, the blade housing 14 includes the bearing structure 88 that interfits and coacts with the bearing structure 113 of the blade 16, namely, the bearing race 112, the vertical bearing surface 106a, and the horizontal bearing surface 90a of the blade 16. The blade bearing structure 113 and the blade housing bearing structure 88 together form a bearing interface or configuration 123 of the rotary knife 10. The projections 89 of the bearing structure 88 are each defined by the inner wall 86 in the region of the annular opening 87.

The annular opening 87 of the blade housing 16 includes a generally C-shaped annular recess 138 sized to receive the drive gear section 68 of the rotary knife blade annular body 94. An annular, upper horizontal surface of the blade support section inner wall 86, defining an upper portion of the C-shaped annular recess 138, comprises a generally horizontal bearing surface 138a. In the regions of the radially inward projections 89 of the bearing structure 88, the C-shaped annular recess 138 is defined by a generally vertical portion of the blade support section inner wall 86. This generally vertical portion of the blade support section inner wall 86 in the regions of the radially inward projections 89 comprises a generally vertical bearing surface 138b. The generally horizontal bearing surface 138a of the blade housing bearing structure 88 bears against the generally horizontal bearing surface 90a of the blade bearing structure 113 and the generally vertical bearing surface 138b of the blade housing bearing structure 88 bears against the generally vertical bearing surface 106a of the blade bearing structure 113.

The blade housing annular opening 87 is further defined by the radially inward projections 89 of the bearing structure 88, the projections being disposed below the annular recess 138. The blade housing bearing structure 88, for each projection 89, includes a first bearing surface 140 engaging the first bearing surface 116 of the rotary knife blade bearing race 112, a second bearing surface 142 engaging the second bearing surface 118 of the rotary knife blade bearing race, and a third bearing surface 144 engaging the third bearing surface 120 of the rotary knife blade bearing surface. The first bearing surface 140 is generally planar in the horizontal direction and substantially parallel to the planes defined by the upper and lower axial ends 130, 132 of the blade housing blade support section 82. The second bearing surface 142 is generally cylindrical, orthogonal to the first bearing surface 140 and the upper and lower axial ends 130, 132 and substantially parallel to the blade housing central axis. The first and second bearing surfaces 140, 142 can be viewed a substantially right-angled boss 141 of the blade housing bearing structure 88 that projects radially inwardly into and bears against the first and second bearing surfaces 116, 118 defined by the notch 122 of the blade bearing race 112. The third bearing surface 144 is generally frustoconical, converging in a direction proceeding toward the lower axial end 132 of the blade housing blade support section 82. Note that between the second and third bearing surfaces 142, 144 there is a small semicircular recess 143 that is provided for clearance purposes.

The outer wall 84 of the blade housing blade support section 82 includes an upper, generally cylindrical section 146 and a lower, frustoconical section 148, converging in a direction proceeding toward the lower axial end 132 of the blade housing blade support section 82. A lower portion 150 of the upper cylindrical section 146 terminates approximately in horizontal alignment with the upper axial end 90 of the blade 16. As can be seen in FIG. 7, an upper portion 152 of the blade housing blade support section 82 is thick and blocky to provide the strength and rigidity necessary to absorb the substantial torque applied to the blade housing 14 by the operator when, for example, applying significant force to the handle grip 27 when using a distal or forwardmost end F (FIG. 2) of the knife 10 to cut a thick, dense piece of meat or cutting against a bone. At the same time, the lower frustoconical section 148 is sharply raked or angled to provide clearance and minimize friction between the blade housing outer wall 84 and the remainder of the piece of meat that the trimming or cutting is being done with respect to.

In FIG. 7 discussed above, a sectional view of the blade 16 and blade housing is schematically shown in a region where a bearing projection 89 is present. For completeness, in FIG. 8, a sectional view of the blade 16 and blade housing 14 is schematically shown in a region where a recessed drain/exit region 89a is present. As can be seen in FIG. 8, the right-angled boss 141 of the projection 89 of blade housing bearing structure 88, is not present in the the recessed region 89a. Instead, the angled boss 141 is replaced by a flat, frustoconical portion 145 that defines a lower portion of the blade housing inner wall 86.

A gap G exists between the blade housing inner wall 86 and the outer wall 100 of the blade 16 to facilitate for draining of fat, meat and other debris that accumulate in the annular opening 87 during operation of the knife 10. As seen in FIG. 8, the gap G extends between the blade housing annular recess 130 and the blade cylindrical first section 106 in a region labeled G1. As can be seen in comparing FIGS. 7 and 8, in FIG. 8, the generally vertical blade housing bearing surface 138b is not present. Instead, the blade support section inner wall 84 is recessed radially outwardly such that the gap G exists between the cylindrical first portion 106 of the blade 16 and inner wall 86 in the region G1. The gap G further extends downwardly between the frustoconical portion 145 of the blade housing inner wall 86 and the blade annular middle bearing race section 104 in a region labeled G2 to the lower axial end 132 of the blade housing 14, as explained above, due to the removal of the blade housing angled boss 141.

Advantages of Rotary Knife 10 Over Prior Art

Figure 13:
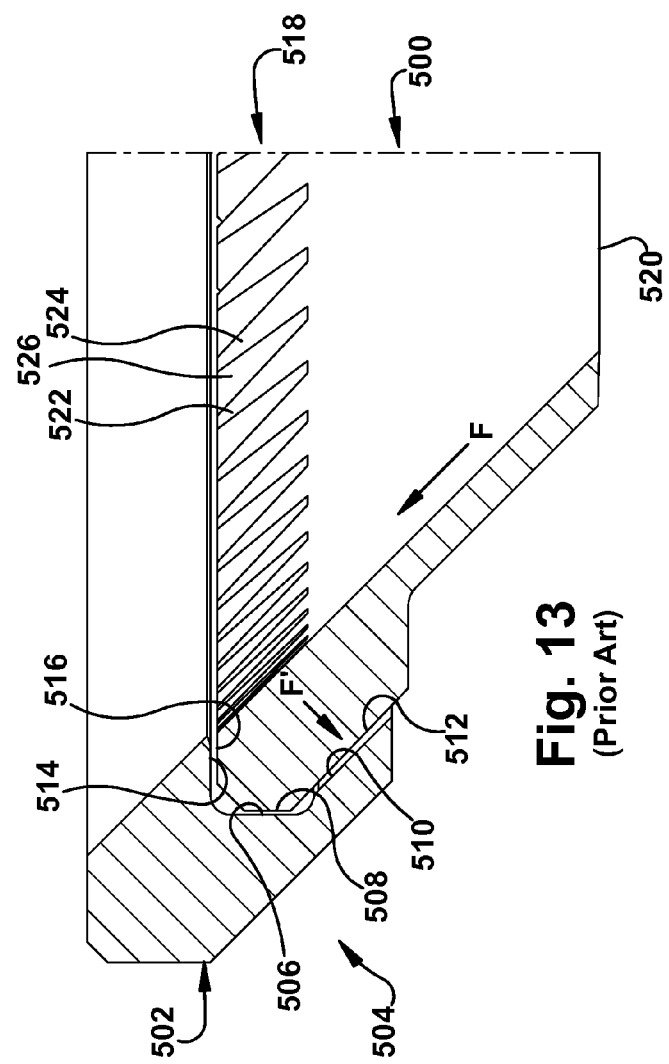
FIG. 13 is a schematic section view of a prior art large diameter, rotary knife blade and a mating blade housing.

The power operated rotary knife 10 of the present disclosure mitigates the problems of wearing of the blade radial outer surface 106 and resulting vibration characteristic of prior art, large diameter blades. Advantageously, the middle bearing race section 104 of the annular body 94 of the blade 16 enlarges or enhances the area of bearing interface between the blade bearing structure 113 and the blade housing bearing structure 88 resulting in an improved bearing configuration 123 for the rotary knife. Specifically, the middle bearing race section 104 includes the notch 122 that provides for an enhanced or enlarged area of bearing contact between the blade bearing race 112 and the corresponding blade housing bearing structure 88. By way of example, in on exemplary embodiment, when viewed in cross section as seen in FIG. 7, the bearing surfaces 116, 118, 120 have respective lengths of approximately 0.022 inches, 0.020 inches and 0.040 inches, for a total effective bearing surface length of approximately 0.082 inches. By comparison, the prior art blade 500, which is similar in outer diameter, inner diameter and axial height to the blade 16, when viewed in cross section as seen in FIG. 13, for the frustoconical bearing surface 512, has an effective bearing surface length of 0.076 inches. Thus, the effective bearing length of the blade bearing race 112 of the blade 16 of the present disclosure is 0.006 inch greater, in percentage terms, an increase of 7.9%.

In addition to the greater bearing area provided by the bearing race 112, the bearing surfaces 116, 118, 120 are solid, that is, they are not weakened or reduced by gaps between the plurality of gear teeth as is the case with, for example, the vertical blade bearing surface 508 of the prior art blade design 500. Thus, the increased bearing area afforded by the blade bearing race 112 of the blade 16 reduces the rate of wear experienced by the vertical bearing surface 106a of the drive gear section 68 of the blade 16. The vertical bearing surface 118 of the bearing race 112 and the vertical bearing surface 106a of the drive gear section 68 share or split the radially outwardly directed component of loading force transmitted through the blade 16 during cutting or trimming operations. Since the vertical bearing surface 118 accepts and bears a portion of the force that would be otherwise be absorbed by the gear vertical bearing surface 106a and since, unlike gear vertical bearing surface 106a, the vertical bearing surface 118 of the bearing race 112 is solid, the rate of wear experienced by the gear vertical bearing surface 106a is reduced. This advantageously provides for less vibration during use of the knife 10 and mitigates the need for or prolongs the time until the operator is required to change the diameter of the blade housing 14 during use of the knife 10.

Stated another way, in the rotary knife 10 of the present disclosure the enhanced area of bearing contact afforded by the notched bearing race 112 is offset radially inwardly of and axially from the radial outer surface 106 of the drive gear region 68 of the blade 16 thereby reducing wear on the radial outer surface of the blade drive gear region. Thus, the blade 16, the blade housing 14, the blade bearing race 112, and the blade housing bearing structure 88 of the present disclosure advantageously provide for less vibration during use and mitigate the need for or prolong the time until the operator is required to change the diameter of the blade housing 14 during use of the knife 10.

Second Exemplary Embodiment of Rotary Knife 200

Figure 11:
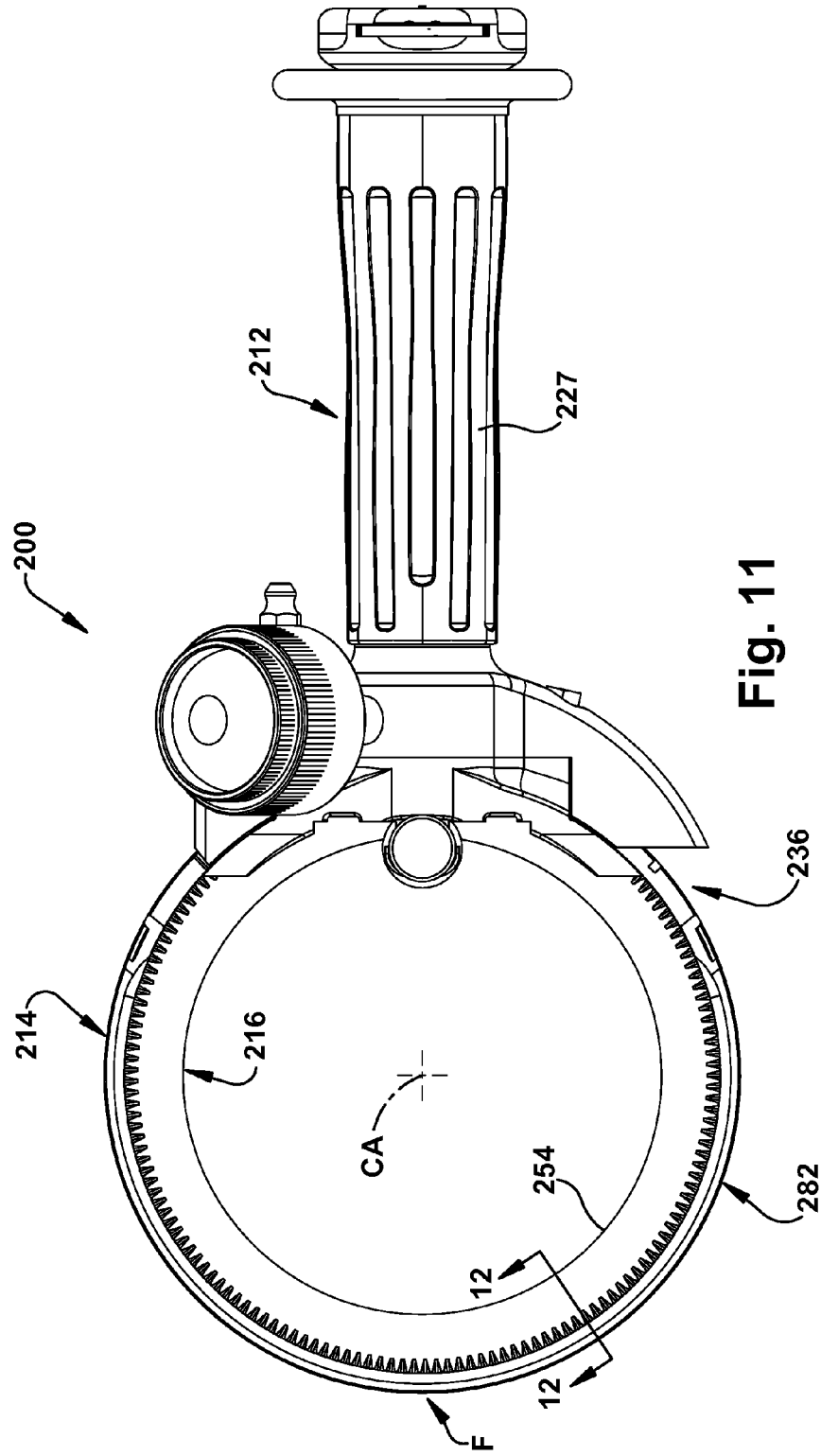
FIG. 11 is a schematic top plan view of a second exemplary embodiment of a large diameter, power operated rotary knife of the present disclosure.

A second exemplary embodiment of a power operated rotary knife of the present disclosure is shown generally at 200 in FIG. 11. The rotary knife 200 of the second embodiment is similar in overall configuration to the rotary knife 10 of the first embodiment and includes a rotary knife blade 216 supported for rotation within a blade housing 214. The blade housing 214 includes a mounting section 236 and a blade support section 282, similar to the first embodiment. FIG. 9 schematically illustrates a sectional view of the bearing interface of the rotary knife blade 216 and the blade support section 282 of the blade housing 214. As can be seen in FIG. 9, the blade is more sharply raked than the blade 16 of the first embodiment, that is, if an angle α is drawn between an axis CA' which is parallel to the central axis of rotation CA of the blade 216 and an inner wall 298, the angle α would be greater than a corresponding angle α between the central axis CA and the inner wall 98 of the first embodiment rotary knife blade 16. In one exemplary embodiment of the rotary knife 200, an outer diameter of the blade 216 is approximately the same as the outer diameter of the first embodiment blade 16, namely, about 5 inches. However, an inner diameter of the blade 216 at a lower axial end 292 of the blade is approximately 4 inches, compared to a larger inner diameter of the first embodiment blade 16 at the lower axial end 92 of approximately 4.4 inches. Like the blade 16 of the first embodiment, the axial height of the blade 216 of the present embodiment from upper axial end 290 to lower axial end 292 is approximately 0.28 inches.

Additionally, in the first embodiment knife blade 16, the annular, frustoconical surface second portion 114 of the outer wall 100 was substantially parallel to the frustoconical outer wall 103a of the annular blade section 102 and to the frustoconical inner wall 103b of the blade section 102. In the second embodiment knife blade 216, an annular, frustoconical surface second portion 314 of an outer wall 300 is not parallel to a frustoconical outer wall 303a of an annular blade section 302 nor is the frustoconical outer wall 303a parallel to a frustoconical inner wall 303b of the blade section 302.

Blade Bearing Race 312

Figure 12:
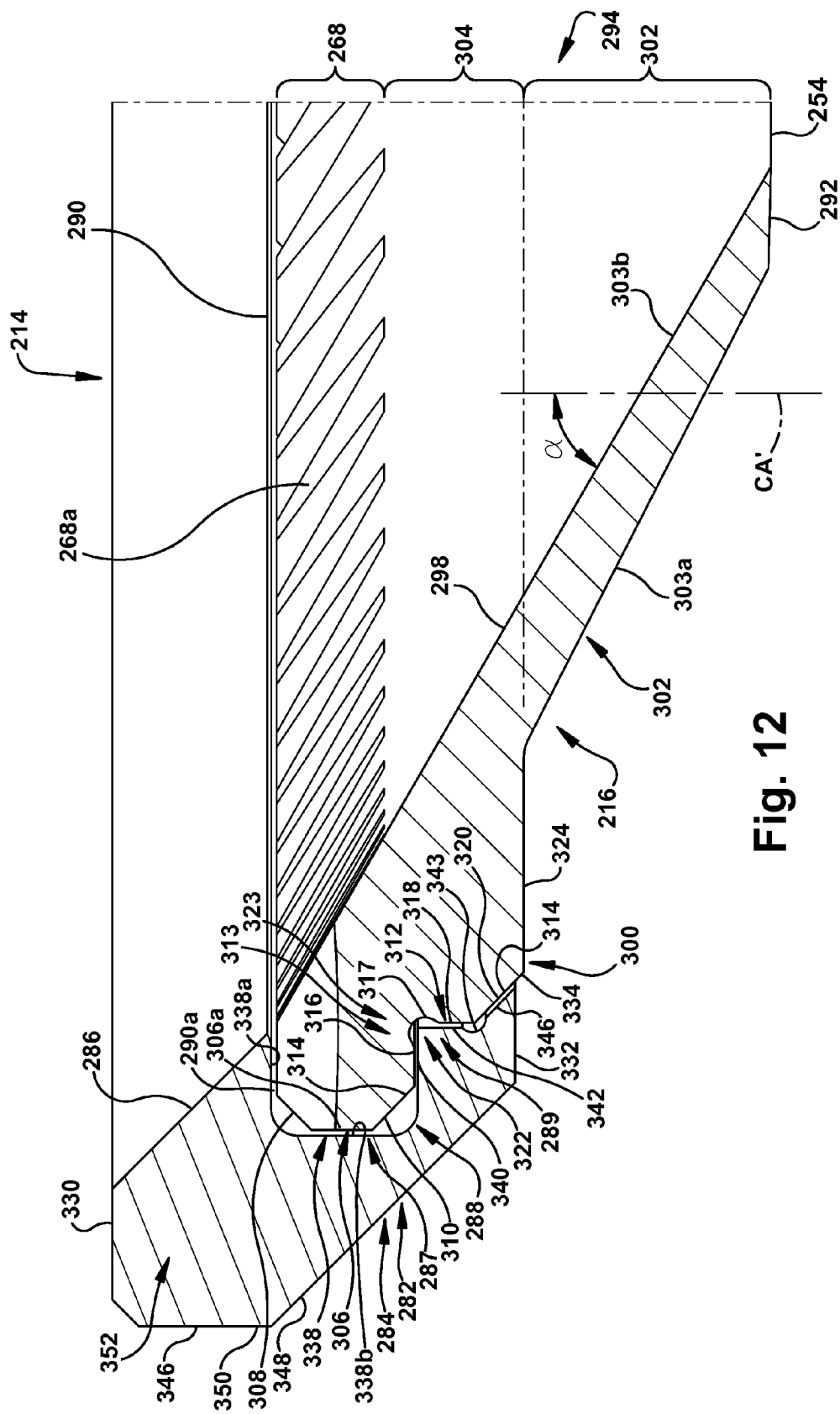
FIG. 12 is schematic sectional view of a rotary knife blade and a mating blade housing of the power operated rotary knife of FIG. 11 as seen from a plane indicated by the line 12-12 in FIG. 11.

As can best be seen in FIG. 12, the rotary knife blade 216 includes the upper surface or upper axial end 290 and the axially spaced apart a lower surface or lower axial end 292 with a rotatable annular body 294 disposed therebetween. A central axis of the rotatable annular body 294 is congruent with and the same as the blade central axis CA. The upper axial end 290 includes an upper surface of a plurality of gear teeth 268a, while the lower axial end 292 includes a lower surface of a cutting edge 254 of the blade.

The rotatable annular body 294 is disposed about the central axis CA and is bounded by the upper axial end 290, the lower axial end 292, the inner wall 298, and the radially spaced apart outer wall 300. The blade annular body 294 includes: a) an annular drive gear section 268 adjacent the upper axial end 290 which is adapted to be rotatably driven by the pinion gear 20; b) an annular blade section 302 adjacent the lower axial end 292; and c) an annular middle bearing race section 304 extending axially therebetween.

The first portion 306 of the outer wall 300 corresponding to the drive gear section 268 of the blade 216 is generally cylindrical. As can be seen in FIG. 9, the first portion 306 comprises the radial outer surface of a drive gear section or region 268 and also comprises the outermost radial surface of the blade 216 and the blade outer wall 300. Disposed axially above the outer wall first portion 306 is a short, angled chamfer 308 that is provided for clearance purposes. Disposed axially below the first portion 306 is a short, frustoconical, angled lower portion 310 that transitions to the middle section 304.

The annular drive gear section 268, which is adjacent the upper axial end 290, defines two bearing surfaces: 1) a generally vertical bearing surface 306a, defined by a radial outer surface of the plurality of gear teeth 268a and corresponding to the cylindrical first portion 306; and 2) a generally horizontal bearing surface 290a, defined by an upper surface of the plurality of gear teeth 268a and corresponding to the upper axial end 290.

The middle section 304 of the blade annular body 294 defines a bearing race 312 in the second frustoconical portion 314 of the outer wall 300. The outer wall second portion 314 is generally frustoconical, converging, that is, having a reducing diameter, in a direction proceeding toward the lower axial end 292. The bearing race 312 includes three bearing surfaces or faces 316, 318, 320. The bearing race 312 includes a notch 322 extending radially inwardly from the outer wall frustoconical second portion 314 of the outer wall 300. The notch 322 defines the first and second bearing surfaces 316, 318. The third bearing surface 320 is defined by a region of the frustoconical second portion 314 of the outer wall 300 generally adjacent and spaced axially below the notch 322.

The first bearing surface 316 is substantially parallel to a plane defined by the upper axial end 290 of the blade 216 and is substantially orthogonal to the annular body/blade central axis CA. The second bearing surface 318 substantially orthogonal to the first bearing surface 316 and is substantially parallel to the annular body central axis CA. The third bearing surface 320 is transverse to the first and second bearing surfaces 316, 318 and is transverse to the blade central axis. Note that between the first and second bearing surfaces 316, 318, there is a small semicircular recess 317 that is provided for clearance purposes.

A bearing structure 313 of the blade 216 includes the vertical bearing surface 306a and the horizontal bearing surface 290a of the annular drive gear section 268 and the first, second and third bearing surfaces 316, 318, 320 of the annular middle bearing race section 304 of the blade.

The annular blade section 302 of the blade annular body 294 extends downwardly and radially inwardly from the middle bearing race section 304. A transition region 324 of the outer wall 300 corresponding to the transition between a lower portion of the middle bearing race section 304 and an upper portion of blade section 302 is stepped radially inwardly from the middle bearing race section 304 to the blade section 302. As to both the inner wall 298 and the outer wall 300, the blade section 302 is generally frustoconical, converging in a direction proceeding toward the lower axial end 292. Stated another way, the blade section outer wall 303a and the blade section inner wall 303b are both generally frustoconical. The blade section defines the cutting edge 254 of the blade 216 in a region of the lower axial end 292.

Blade Housing Bearing Structure 288

As can best be seen in FIG. 12, the blade housing blade support section 282 supports the blade 216 for rotation in the annular opening 287 defined in the inner wall 286 of the blade housing. The blade housing 214 includes an upper axial end 330 and a lower axial end 332. The upper axial end 330 is generally planar and substantially congruent with the plane defined by the upper axial end 290 of the blade 216. The annular blade section 302 of the blade 216 extends below the lower axial end 330 of the blade housing blade support section 282, as does a small, lower portion 334 of the annular middle bearing race section 304 of the blade 216.

The blade housing 214 includes the bearing structure 288 that interfits and coacts with the bearing structure 313 of the blade 216, namely, the bearing race 312, the vertical bearing surface 306a, and the horizontal bearing surface 290a of the blade 216. The blade bearing structure 313 and the blade housing bearing structure 288 together form a bearing interface or configuration 323 of the rotary knife 200. The projections 289 of the bearing structure 288 are each defined by the inner wall 286 in the region of the annular opening 287.

The annular opening 287 of the blade housing 216 includes a generally C-shaped annular recess 338 sized to receive the drive gear section 268 of the rotary knife blade annular body 294. An annular, upper horizontal surface of the blade support section inner wall 286 defining an upper portion of the C-shaped annular recess 338 comprises a generally horizontal bearing surface 338a, substantially aligned with and overlying the horizontal bearing surface 290a of the blade drive gear section 268. In the regions of the radially inward projections 289 of the bearing structure 288, the C-shaped annular recess 338 is defined by a generally vertical portion of the blade support section inner wall 286. This generally vertical portion of the blade support section inner wall 286 in the regions of the radially inward projections 289 comprises a generally vertical bearing surface 338b. The generally horizontal bearing surface 338a of the blade housing bearing structure 288 bears against the generally horizontal bearing surface 290a of the blade bearing structure 313 and the generally vertical bearing surface 338b of the blade housing bearing structure 288 bears against the generally vertical bearing surface 306a of the blade bearing structure 313.

The bearing structure 288, for each projection 289, includes a first bearing surface 340 engaging the first bearing surface 316 of the rotary knife blade bearing race 312, a second bearing surface 342 engaging the second bearing surface 318 of the rotary knife blade bearing race, and a third bearing surface 344 engaging the third bearing surface 320 of the rotary knife blade bearing surface. The first bearing surface 340 is generally planar in the horizontal direction and substantially parallel to the planes defined by the upper and lower axial ends 330, 332 of the blade housing blade support section 282. The second bearing surface 342 is generally cylindrical, orthogonal to the first bearing surface 340 and the upper and lower axial ends 330, 332 and substantially parallel to the blade housing central axis. The third bearing surface 344 is generally frustoconical, converging in a direction proceeding toward the lower axial end 332 of the blade housing blade support section 282. Note that between the second and third bearing surfaces 342, 344 there is a small semicircular recess 343 that is provided for clearance purposes.

The outer wall 284 of the blade housing blade support section 282 includes an upper, generally cylindrical section 346 and a lower, frustoconical section 348, converging in a direction proceeding toward the lower axial end 332 of the blade housing blade support section 282. A lower portion 350 of the upper cylindrical section 346 terminates approximately in horizontal alignment with the upper axial end 290 of the blade 216. As can be seen in FIG. 12, an upper portion 352 of the blade housing blade support section 282 is thick and blocky to provide the strength and rigidity necessary to absorb the substantial torque applied to the blade housing 214 by the operator when, for example, applying significant force to the handle grip 227 when using a distal or forwardmost end F (FIG. 11) of the knife 200 to cut a thick, dense piece of meat or cutting against a bone. At the same time, the lower frustoconical section 348 is sharply raked or angled to provide clearance and minimize friction between the blade housing outer wall 284 and the remainder of the piece of meat that the trimming or cutting is being done with respect to.

The power operated rotary knife 200 of the present disclosure mitigates the problems of wearing of the blade radial outer surface 306 and resulting vibration characteristic of prior art, large diameter blades. Advantageously, the middle bearing race section 304 of the annular body 294 of the blade 216 functions to enlarged or enhanced the area of bearing interface between the blade bearing structure 313 and the blade housing bearing structure 288 resulting in an improved bearing configuration 323 for the rotary knife. Specifically, the middle bearing race section 304 includes the notch 222 that provides for an enhanced or enlarged area of bearing contact between the blade bearing race 312 and the corresponding blade housing bearing structure 288.

In addition to the greater bearing area provided by the bearing race 312, the bearing surfaces 316, 318, 320 are solid, that is, they are not weakened or reduced by gaps between the plurality of gear teeth as is the case with, for example, the vertical blade bearing surface 508 of the prior art blade design 500. Thus, the increased bearing area afforded by the blade bearing race 312 of the blade 216 reduces the rate of wear experienced by the vertical bearing surface 306*a* of the drive gear section 268 of the blade 216. The vertical bearing surface 318 of the bearing race 312 and the vertical bearing surface 306*a* of the drive gear section 268 share or split the radially outwardly directed component of loading force transmitted through the blade 216 during cutting or trimming operations. Since the vertical bearing surface 318 accepts and bears a portion of the force that would be otherwise be absorbed by the gear vertical bearing surface 306*a* and since, unlike gear vertical bearing surface 306*a*, the vertical bearing surface 318 of the bearing race 312 is solid, the rate of wear experienced by the gear vertical bearing surface 306*a* is reduced. This advantageously provides for less vibration during use of the knife 200 and mitigates the need for or prolongs the time until changing the diameter of the blade housing 214 during use of the knife 200.

Stated another way, in the rotary knife 200 of the present disclosure, the enhanced area of bearing contact afforded by the notched bearing race 312 is offset radially inwardly of and axially from the radial outer surface 306 of the drive gear region 268 of the blade 216 thereby reducing wear on the radial outer surface of the blade drive gear region. Thus, the blade 216, the blade housing 214, the blade bearing structure 113, and the blade housing bearing structure 288 of the present disclosure advantageously provide for less vibration during use and mitigate the need for or prolong the time until the operator is required to change the diameter of the blade housing 214 during use of the knife 200.

As used herein, terms of orientation such as upper, lower, inward, outward, forward, etc., are provided for convenience purposes and relate generally to the orientation shown in the Figures. Such orientation terms are not intended to limit the scope of the present disclosure or the claims appended hereto.

What have been described above are examples of the present disclosure/invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A rotary knife blade for a power operated rotary knife, the rotary knife blade comprising:
    a) a rotatable annular body disposed about a central axis and bounded by an upper axial end, an axially spaced apart lower axial end, an inner wall, and a radially spaced apart outer wall, the annular body including an annular drive gear section adjacent the upper axial end adapted to be rotatably driven by a pinion gear, an annular blade section adjacent the lower axial end, and an annular middle bearing race section extending axially therebetween;
    b) the drive gear section comprising a plurality of spaced apart gear teeth extending downwardly from the upper axial end and extending between and through the outer wall and the inner wall, a first portion of the outer wall corresponding to the drive gear section being generally cylindrical;
    c) the middle section defining a bearing race in a second portion of the outer wall corresponding to the middle section, the outer wall second portion being generally frustoconical, converging in a direction proceeding toward the lower axial end, the bearing race comprising a notch extending radially inwardly from the outer wall frustoconical second portion defining first and second bearing surfaces and a region of the outer wall frustoconical second portion adjacent and below the notch defining a third bearing surface, the first bearing surface substantially parallel to a plane defined by the upper axial end and orthogonal to the annular body central axis, the second bearing surface substantially orthogonal to the first bearing surface and parallel to the annular body central axis, and the third bearing surface transverse to the first and second bearing surfaces and the annular body central axis; and
    d) the blade section extending downwardly and radially inwardly from the middle section, a portion of the outer wall corresponding to the blade section being stepped radially inwardly from the portion of the outer wall corresponding to the middle section and being generally frustoconical, converging in a direction proceeding toward the lower axial end, the blade section defining a cutting edge at the lower axial end.

2. The rotary knife blade of claim 1 wherein the inner wall extending between the upper axial end and the lower axial end is generally frustoconical converging in a direction proceeding toward the lower axial end.

3. The rotary knife blade of claim 1 wherein an angle of the portion of the frustoconical outer wall corresponding to the middle bearing race section with respect to the central axis is substantially the same as an angle of the portion of the frustoconical outer wall corresponding to the blade section.

4. The rotary knife blade of claim 1 wherein an angle of the frustoconical inner wall with respect to the central axis is substantially the same as the angle of the portion of the frustoconical outer wall corresponding to the middle bearing race section with respect to the central axis.

5. The rotary knife blade of claim 1 wherein an angle of the frustoconical inner wall with respect to the central axis is substantially the same as an angle of the portion of the frustoconical outer wall corresponding to the blade section.

6. The rotary knife blade of claim 1 wherein the generally cylindrical surface of the outer wall portion corresponding to the gear section is substantially parallel to the central axis.

7. The rotary knife blade of claim 1 wherein the drive gear section defines two bearing surfaces: a) a generally vertical bearing surface, defined by a radial outer surface of the plurality of gear teeth and corresponding to the cylindrical outer wall first portion; and 2) a generally horizontal bearing surface, defined by an upper surface of the plurality of gear teeth and corresponding to the upper axial end.

8. A combination of a rotary knife blade and blade housing for a power operated rotary knife, the combination comprising:
 a) an annular knife blade and a split blade housing configured to support the annular knife blade for rotation therein;
 b) the annular knife blade including a rotatable annular body disposed about a central axis and bounded by an upper axial end, an axially spaced apart lower axial end, an inner wall, and a radially spaced apart outer wall, the annular body including an annular drive gear section adjacent the upper axial end adapted to be rotatably driven by a pinion gear, an annular blade section adjacent the lower axial end, and an annular middle bearing race section extending axially therebetween;
 c) the drive gear section comprising a plurality of spaced apart gear teeth extending downwardly from the upper axial end and extending between and through the outer wall and the inner wall, a portion of the outer wall corresponding to the drive gear section being generally cylindrical;
 d) the middle section comprising a bearing race extending radially inwardly in a portion of the outer wall in the middle section, the bearing race defined by a first bearing surface substantially parallel to a plane defined by the upper axial end and orthogonal to the annular body central axis and a second bearing surface substantially orthogonal to the first bearing surface and parallel to the annular body central axis, the portion of the outer wall corresponding to the middle section being generally frustoconical, converging in a direction proceeding toward the lower axial end; and
 e) the blade section extending downwardly and radially inwardly from the middle section, a portion of the outer wall corresponding to the blade section being stepped radially inwardly from the portion of the outer wall corresponding to the middle section and being generally frustoconical, converging in a direction proceeding toward the lower axial end, the blade section defining a cutting edge at the lower axial end;
 f) the blade housing including a mounting section and an annular blade support section, the blade support section including an outer wall and a radially spaced apart inner wall, the inner wall defining an annular recess sized to receive the drive gear section of the annular knife blade annular body and a radially inwardly projecting bearing structure disposed below the annular recess, the bearing structure including a first bearing surface adapted to engage the first bearing surface of the annular knife blade bearing race and a second bearing surface adapted to engage the second bearing surface of the annular knife blade bearing race.

9. The combination of claim 8 wherein the inner wall of the annular knife blade extending between the upper axial end and the lower axial end is generally frustoconical converging in a direction proceeding toward the lower axial end.

10. The combination of claim 8 wherein an angle of the portion of the frustoconical outer wall of the annular knife blade corresponding to the middle bearing race section with respect to the central axis is substantially the same as an angle of the portion of the frustoconical outer wall corresponding to the blade section.

11. The combination of claim 8 wherein an angle of the frustoconical inner wall of the annular knife blade with respect to the central axis is substantially the same as the angle of the portion of the frustoconical outer wall corresponding to the middle bearing race section with respect to the central axis.

12. The combination of claim 8 wherein an angle of the frustoconical inner wall of the annular knife blade with respect to the central axis is substantially the same as an angle of the portion of the frustoconical outer wall corresponding to the blade section.

13. The combination of claim 8 wherein the generally cylindrical surface of the outer wall portion corresponding to the gear section of the rotary annular knife blade is substantially parallel to the central axis.

14. The combination of claim 8 wherein the bearing structure of the blade housing is defined by a plurality of circumferentially spaced apart bearing projections formed in the annular blade support section.

15. The combination of claim 8 wherein the mounting section of the blade housing includes a circularly curved wall adapted to be mounted to the power operated rotary knife and a split extends through the mounting section.

16. The combination of claim 8 wherein the radially inwardly projecting bearing structure of the blade support section comprises a plurality of spaced apart bearing projections radially spaced apart by recessed drain regions that do not contact the blade.

17. The combination of claim 8 wherein the blade drive gear section defines two bearing surfaces: a) a generally vertical bearing surface, defined by a radial outer surface of the plurality of gear teeth and corresponding to the cylindrical outer wall first portion; and 2) a generally horizontal bearing surface, defined by an upper surface of the plurality of gear teeth and corresponding to the upper axial end and further wherein the blade housing annular recess sized to receive the drive gear section of the annular knife blade annular body defines: a) a generally horizontal bearing surface adapted to engage the generally horizontal bearing surface of the blade drive gear section; and b) a generally vertical bearing surface adapted to engage the generally vertical bearing surface of the blade drive gear section.

18. A power operated rotary knife comprising:
 a) an annular knife blade;
 b) a split blade housing configured to support the annular knife blade for rotation therein;
 c) a handle assembly including a head member; and
 d) a clamping assembly for securing the blade housing to the head member of the handle assembly;
 e) the annular knife blade including a rotatable annular body disposed about a central axis and bounded by an upper axial end, an axially spaced apart lower axial end, an inner wall, and a radially spaced apart outer wall, the annular body including an annular drive gear section adjacent the upper axial end adapted to be rotatably driven by a pinion gear, an annular blade section adjacent the lower axial end, and an annular middle bearing race section extending axially therebetween;
 f) the drive gear section comprising a plurality of spaced apart gear teeth extending downwardly from the upper axial end and extending between and through the outer wall and the inner wall, a portion of the outer wall corresponding to the drive gear section being generally cylindrical;
 g) the middle section comprising a bearing race extending radially inwardly in a portion of the outer wall in the middle section, the bearing race defined by a first bearing surface substantially parallel to a plane defined by the upper axial end and orthogonal to the annular body central axis and a second bearing surface substantially orthogonal to the first bearing surface and parallel to the annular body central axis, the portion of the outer wall corresponding to the middle section being generally frustoconical, converging in a direction proceeding toward the lower axial end;

h) the blade section extending downwardly and radially inwardly from the middle section, a portion of the outer wall corresponding to the blade section being stepped radially inwardly from the portion of the outer wall corresponding to the middle section and being generally frustoconical, converging in a direction proceeding toward the lower axial end, the blade section defining a cutting edge at the lower axial end;

i) the blade housing including a mounting section and an annular blade support section, the mounting section being disposed between the clamping assembly and the handle assembly head member to secure the blade housing to the handle assembly, the blade support section including an outer wall and a radially spaced apart inner wall, the inner wall defining an annular recess sized to receive the drive gear section of the annular knife blade annular body and a radially inwardly projecting bearing structure disposed below the annular recess, the bearing structure including a first bearing surface adapted to engage the first bearing surface of the annular knife blade bearing race and a second bearing surface adapted to engage the second bearing surface of the annular knife blade bearing race.

19. The power operated rotary knife of claim 18 wherein the inner wall of the annular knife blade extending between the upper axial end and the lower axial end is generally frustoconical converging in a direction proceeding toward the lower axial end.

20. The power operated rotary knife of claim 18 wherein an angle of the portion of the frustoconical outer wall of the annular knife blade corresponding to the middle bearing race section with respect to the central axis is substantially the same as an angle of the portion of the frustoconical outer wall corresponding to the blade section.

21. The power operated rotary knife of claim 18 wherein an angle of the frustoconical inner wall of the annular knife blade with respect to the central axis is substantially the same as the angle of the portion of the frustoconical outer wall corresponding to the middle bearing race section with respect to the central axis.

22. The power operated rotary knife of claim 18 wherein an angle of the frustoconical inner wall of the annular knife blade with respect to the central axis is substantially the same as an angle of the portion of the frustoconical outer wall corresponding to the blade section.

23. The power operated rotary knife of claim 18 wherein the generally cylindrical surface of the outer wall portion corresponding to the gear section of the annular knife blade is substantially parallel to the central axis.

24. The power operated rotary knife of claim 18 wherein the bearing structure of the blade housing is defined by a plurality of circumferentially spaced apart bearing projections formed in the annular blade support section.

25. The power operated rotary knife of claim 18 wherein the mounting section of the blade housing includes a circularly curved wall adapted to be mounted to the power operated rotary knife and a split extends through the mounting section.

26. The power operated rotary knife of claim 18 wherein the radially inwardly projecting bearing structure of the blade support section comprises a plurality of spaced apart bearing projections radially spaced apart by recessed regions that do not contact the blade.

27. The power operated rotary knife of claim 18 wherein the blade drive gear section defines two bearing surfaces: a) a generally vertical bearing surface, defined by a radial outer surface of the plurality of gear teeth and corresponding to the cylindrical outer wall first portion; and 2) a generally horizontal bearing surface, defined by an upper surface of the plurality of gear teeth and corresponding to the upper axial end and further wherein the blade housing annular recess sized to receive the drive gear section of the annular knife blade annular body defines: a) a generally horizontal bearing surface adapted to engage the generally horizontal bearing surface of the blade drive gear section; and b) a generally vertical bearing surface adapted to engage the generally vertical bearing surface 106a of the blade drive gear section.

* * * * *